US011244357B2

(12) United States Patent
Eustace et al.

(10) Patent No.: US 11,244,357 B2
(45) Date of Patent: *Feb. 8, 2022

(54) RULES-BASED TARGETED CONTENT MESSAGE SERVING SYSTEMS AND METHODS

(71) Applicant: Get Smart Content Inc., Austin, TX (US)

(72) Inventors: James Eustace, Austin, TX (US); Kim Go, Round Rock, TX (US); Michael Hovey, Austin, TX (US)

(73) Assignee: PERSONA IP LICENSING, LLC

( * ) Notice: Subject to any disclaimer, the term of this patent is extended or adjusted under 35 U.S.C. 154(b) by 0 days.

This patent is subject to a terminal disclaimer.

(21) Appl. No.: 16/258,005

(22) Filed: Jan. 25, 2019

(65) Prior Publication Data

US 2019/0228437 A1 Jul. 25, 2019

Related U.S. Application Data

(63) Continuation of application No. 14/463,293, filed on Aug. 19, 2014, now Pat. No. 10,235,694, which is a continuation of application No. 12/699,164, filed on Feb. 3, 2010, now Pat. No. 8,849,847.

(51) Int. Cl.
*G06F 16/835* (2019.01)
*G06Q 30/02* (2012.01)
*H04L 29/08* (2006.01)

(52) U.S. Cl.
CPC ..... *G06Q 30/0269* (2013.01); *G06F 16/8373* (2019.01); *G06Q 30/0243* (2013.01); *H04L 67/02* (2013.01)

(58) Field of Classification Search
CPC ................................................ G06Q 30/0269
See application file for complete search history.

(56) References Cited

U.S. PATENT DOCUMENTS

| 2008/0195957 A1* | 8/2008 | Kim ................... G06Q 30/0241 715/762 |
| 2008/0306824 A1* | 12/2008 | Parkinson .............. G06Q 30/02 705/14.73 |
| 2010/0076851 A1* | 3/2010 | Jewell, Jr. .............. G06Q 30/02 705/14.67 |

FOREIGN PATENT DOCUMENTS

WO   WO-0041112 A1 * 7/2000 ............. G06Q 30/02

* cited by examiner

*Primary Examiner* — Dawaune A Conyers
(74) *Attorney, Agent, or Firm* — The Law Firm of H. Dale Langley, Jr., PC

(57) ABSTRACT

A method of serving targeted content messages for display in a website accessed in a browser program of a networked computer communicatively connected to a network at a network address for communications, delivers uniquely targeted content messages displayed in websites viewed in web browsers. The method includes placing a script device in a website file, processing the website file, together with the script device by a particular web browser on download of the website file, including by determining the network address of the networked computer, determining an identifier of the website file, and sending an artifact representing the network address and the identifier over the network to a server computer. The method also includes detecting the network address and the identifier by the server computer, querying a database for a database article related to the network address and the identifier, constructing a script program stored in memory of the server computer for the particular browser and website file, and constructing an ad device stored in memory of the web browser device from the script program. The method further includes calling the server computer by the ad device by communication of an identifier representing an action of the web browser device, receiving the identifier by the server computer, querying the database for a select message artifact related to the script program, the (Continued)

identifier, the website file, and the web browser, and responding by the server computer to the web browser with the select message artifact. A message represented by the select message artifact is displayed in the website then viewed in a browser window of the web browser. Messages can be prioritized and are uniquely targeted in content, based on real-time activities of the web browser.

14 Claims, 12 Drawing Sheets

RULES-BASED TARGETED CONTENT MESSAGE SERVING SYSTEMS AND METHODS

CROSS-REFERENCE TO RELATED APPLICATIONS

The present application is a continuation and has benefit of priority of U.S. patent application Ser. No. 14/463,293, titled "Rules-Based Targeted Content Message Serving Systems And Methods", filed Aug. 19, 2014, which priority application is a continuation of and has benefit of priority of U.S. patent application Ser. No. 12/699,164, titled "S Rules-Based Targeted Content Message Serving Systems and Methods", filed Feb. 3, 2010 and issued on Sep. 30, 2014 as U.S. Pat. No. 8,849,847. The priority application Ser. No. 14/463,293 is co-pending and has at least one same inventor of the present application and is herein incorporated by this reference.

TECHNICAL FIELD

The present disclosure relates generally to communications networks and devices and content serving systems of the networks, and, more particularly, relates to computers and networks for targeted content message serving to networked communications devices according to rules and unique device and network characteristics.

BACKGROUND

Conventionally, a networked communications device operating a web browser program may request a website from a web server of the network. In response to receiving the request, the web server, which maintains or accesses a website file for the website, communicates the website file over the network to the communications device. The web browser program of the communications device translates the website file to provide a graphical display of the website in the web browser program.

The web file for a website consists of a markup language code, typically Hypertext Markup Language (HTML) program code (or a variant of HTML). Elements intended to appear in the website as separate or distinct (such as with unique or special attribute of font, format, appearance, or similar characteristic) are typically organized in the HTML code as a respective HTML tag for each such element. Various types of tags are available with HTML code. For example, HTML div tags are a type of HTML tag which allows particular justification or alignment of an item in the website when displayed in a web browser program. Within such an HTML div tag in the HTML code, a file (such as a .jpg, .gif, text or other) may be named, corresponding to an image and/or text. The HTML div tag allows such image or text to be desirably justified or aligned when displayed in the website.

A limitation of HTML has been that the HTML tags are static as programmed, and provide little, if any, logical or other functionality apart from simple display as the website in accordance with the coded subject matter (e.g., text and named items). All web browsers accessing the website, thus, receive the same website. Text and images set out in HTML tags, including HTML div tags, appear substantially the same to each communications device which accesses the website. HTML does not, itself, make it possible to provide unique content targeted to each respective communications device based on specific interests and characteristics of the device and its user.

In certain conventional systems, a web server may select a particular content, from among alternative content at the server, for correspondence to a particular HTML div tag. These web servers have employed profiles of viewer devices, created from statistical determinations of website viewing history to make content selections. Communications devices accessing the website from the web server are served content chosen based on the statistical profile. These profiles are based on aggregate data of historical viewers of a website, and have limited effectiveness in actually targeting website content for unique interests of any particular individual viewer.

Other systems have employed spy programs (or other similar security intrusions) operated on the communications device to identify activities of the communications device. The spy programs collect such details as prior website or web page browsing practices of the communications device. The activity details are then employed to deliver ads or other downloads to the communications device, such as according to categories or types of websites visited or other actions taken at the communications device. Such ads have typically been in form of pop-up, overlay frame, or separate browser window displays. These types of ads are viewed as distinct from the website, and tend to be distracting and annoying to website viewers. Moreover, such spy programs can present security concerns and affect operations of communications devices on which operating. In essence, these schemes have not effectively delivered specific content within a viewed website, targeted to correspond to unique interests of the particular individual viewer.

It would, therefore, be desirable to provide new and improved systems and methods for delivering uniquely targeted content within a website viewed by a communications device. It would also be desirable to better target the particular content of the website to actual unique interests of each respective viewer, and to limit intrusion and impact to operations of the viewer's communications device in doing so.

SUMMARY

An embodiment of the invention is a system for serving targeted content messages over a network to a web browser device communicatively connected to the network. The web browser device processes a website file of the web browser device as a website. The web browser device has a network address for communicating on the network. The system includes a server computer, including memory, communicatively connected to the network, a database communicatively connected to the server computer, including at least one rule device for the website file and a plurality of message artifacts for the website file, a script constructor of the server computer, including a PHP script builder, a PHP script storage of the server computer, and a PHP script stored in the PHP storage of the server computer. The PHP script is created by the PHP script builder of the script constructor based on the at least one rule device, the website file, and the network address of the web browser device. An ad device of the website file is created by the PHP script builder of the script constructor based on the at least one rule device for the website file, the website file, and the network address of the web browser device. A prioritizer of the database selectively orders retrieval, according to the at least one rule device for the website file, of select ones of the message artifacts for the script constructor. A call article of the ad device is communicatively connected over the network to the server computer. A select message artifact of the database is retrieved by the script constructor based on the PHP script stored in memory and the prioritizer of the database, in response to the call article. A select message is displayed in the website for to the website file in the browser device, the select message display corresponding to the select message artifact. The PHP script stored in memory of the server computer is varied based on the call article, and the message article varies according to the particular PHP script stored in memory at the time of the call article.

Another embodiment of the invention is a method of serving targeted content messages for display in a website accessed in a browser program of a networked computer communicatively connected to a network at a network address for communications. The method includes placing a script device in a website file for the website, processing the website file, together with the script device, in the browser program, including by determining the network address of the networked computer, determining an identifier of the website file, and sending an artifact of the network address and the identifier over the network, to a server computer communicatively connected to the network. The method further includes detecting the network address and the identifier by the server computer, querying a database by the server computer for a database article related to the network address and the identifier, constructing a script program stored in memory of the server computer, based on the step of querying, constructing an ad device stored in memory of the web browser device, based on the script program stored in memory of the server computer of the step of constructing the script program, calling the server computer, by the ad device, by communication of an identifier of an action of the web browser device, receiving the identifier by the server computer, querying the database by the server computer in response to the step of receiving, for a message artifact related to the script program, the identifier, the website file, and the web browser, and responding by the server computer to the web browser device with the message artifact for display as a message in the website.

Yet another embodiment of the invention is a method of providing a targeted content message service over a communications network. The method includes providing an administration website communicatively accessible by a network device over the network, accessing the administration website by the network device via the network, delivering a plurality of message items to the message server database, and setting a rule policy of a message server database by the network device, via input to the administration website, to prioritize respective ones of the plurality of message artifacts. The method further includes providing a website file to a web server computer communicatively connected to the network, the website file includes a specified script device, serving the website file of the web server computer, to a browser program stored in memory of a client device communicatively connected to the network, receiving a unique network address of the client device and an identifier of the website file by a server computer communicatively connected to the network, querying the database for the unique network address and the identifier, based on the rule policy of the step of setting, constructing a script builder stored in memory of the server computer, based on the step of querying the database for the unique network address and the identifier, constructing an ad device by the server computer based on the script builder stored in memory of the server computer, and serving the ad device to the browser program stored in memory of the client device. The method also includes receiving an indicator by the server computer via the network, of an action of the web browser from the ad device, querying the database for a select one of the plurality of message items, based on the indicator, constructing a message artifact by the server computer via the script builder, for the select one of the plurality of message items, sending the message artifact by the server computer, to the browser program stored in memory of the client computer, logging an indicia of the indicator, the select one of the plurality of message artifacts, and the step of sending the select one of the plurality of message artifacts, by the database; and varying the script builder stored in memory of the server computer, based on the step of logging.

In the embodiments, a plurality of websites, each with unique messages, prioritization of messages, and real-time serving of uniquely targeted content to pluralities of web browsers, based on actions, expected interests, and advertising objectives, is contemplated.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
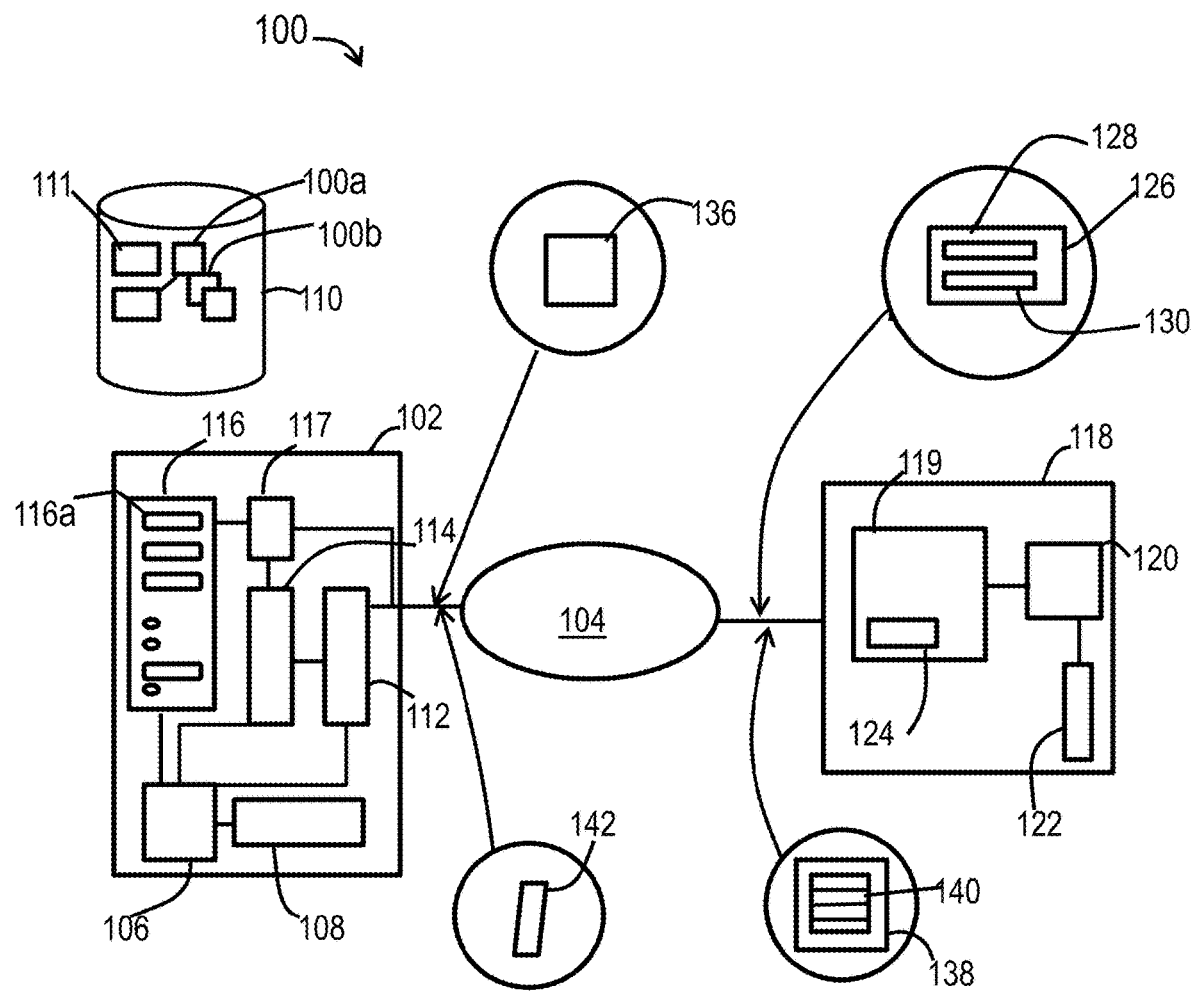
FIG. 1 illustrates a system for targeted content message serving, according to certain embodiments of the invention.

Targeted Message Serving Systems:

Referring to FIG. 1, a system 100 for serving a targeted content message includes a message server device 102 and a browser device 118, each communicatively connected, for example, via a network 104, for communication between the message server device 102 and the browser device 118. The network 104 is any one or more of a wide variety of communicative link, for example, wire, cable, wireless, optic fiber, cellular, wide area network (WAN), local area network (LAN), wireless local area network (WLAN), satellite or other communicative link now or hereafter available, or combinations of any of these.

The browser device 118 of the system 100 is, for example, a client computer or other processing and communication device having or communicatively connected to a browser processor 120, memory 122, and a script device 124. The message server device 102 is, for example, a server computer or other processing and communication device having or communicatively connected to a message server processor 106, memory 108, a database 110, an extension handler 112, a script writer 114, a script storage 116, and a configuration device 117. An example of the network 104 is the Internet, although any other communications network connecting the browser device 118 and the message server device 102 is also contemplated herein.

The browser device 118 includes or accesses a browser program stored in memory 119 (referred to herein as the "browser 119). The browser 119 is controlled by the processor 120, in conjunction with input to and operations of the browser device 118). The script device 124 is hardware and/or software processed by the browser 119 during its operations. In certain embodiments, the script device 124 is a program stored in memory and processed by the browser 119 of the browser device 118. For example, the script device 124 is a script program stored in memory, such as a Flash (.swf) file (or other small file) embedded in JavaScript contained in a website file for a web page. The script device 124 is stored in memory of the browser device 118 upon download by the browser device 118 (via the browser 119) of a website file containing the script program, the website file corresponding to a website that is serviced by the system 100. The script device 124 is concealed during processing in the browser 119. The browser 119 processes the script device 124 while the browser device 118 operates the browser 119. The script device 124, via communications over the network 104 of the browser 119 with the message server device 102, instigates communication of at least one identification device 126 for the browser device 118 as will be later further described.

The message server device 102 includes the extension handler 112. The extension handler 112 is a hardware device(s) or software program(s) stored in memory of the message server device 102, or combinations of such software and hardware. In certain embodiments, the extension handler 112 is a program stored in memory and processed by the processor 106. The extension handler 112 detects incoming communications to the message server device 102 over the network 104, identifies any of the identification device 126 (and any call device(s) 138, as later described) received from the browser device 118 over the network 104, parses each identification device 126 (and each call device 138, as may be applicable) that is received, and directs commencement of operation by the script writer 114 in response to the identification device 126. The extension handler 112 also directs commencement of operation by the configuration device 117 in response to the identification device 126 (and each call device 138, as may be applicable).

The message server device 102 also includes the script writer 114. The script writer 114 operates responsive to the extension handler 112, after receipt of the identification device 126. The script writer 114 is a hardware device(s) or software program(s) stored in memory of the message server device 102, or combinations of such software and hardware. In certain embodiments, the script writer 114 is a program stored in memory and processed by the processor 106. The script writer 126, responsive to the extension handler 112, creates a message server script 116a that is stored in the script memory 116 of the message server device 102. The message server script 116a is, for example, a Hypertext Preprocessor (PHP) server-side scripting language program stored in memory by the script writer 114. The message server script 116a is unique for the particular browser device 118 and the certain website file accessed by the browser 119 containing the script device 124, because of the particular identification device 126 communicated by the browser device 118 to the message server device 102, as later further described. The script writer 114 can also create a replacement message server script 116a (or a new or different message server script 116b) if directed by the extension handler 112 (for example, on receipt of a different identification device corresponding to a different script device of a web file or if directed by rule policies 111 stored in the memory for the database 110, as later further described).

The message server device 102 includes the configuration device 117. The configuration device 117 is a hardware device(s) or software program(s) stored in memory of the message server device 102, or combinations of such software and hardware. The configuration device 117 operates responsive to the script writer 114 creating the message server script 116a on receipt of the identification device 126, and also operates responsive to direction of the extension handler 112 on receipt of any call device 138. On creation of the message server script 116a by the script writer 114, the configuration device 117 processes the message server script 116a and performs a look-up in the database 110 according to rule policies 111 of the database 110 and as dictated by processing of the message server script 116a. The configuration device 117 obtains a report of results of the look-up in the database 110. Data of the report is transformed by the configuration device 117 to create a message device 136. The configuration device 117 directs the message server device 102 to communicate the message device 136 over the network 104 to the browser device 118.

The message device 136 is, for example, a program stored in memory of the message server device 102. On communication and receipt of the message device 136 by the browser device 118, the message device 136 is stored in memory and processed by the browser 119 in lieu of the script device 124 (or, as may be applicable in alternatives, in addition to the script device 124). In certain embodiments, the message device 136 is a script program stored in memory, such as a Flash (.swf) file (or other small file) embedded in JavaScript and processed by the browser 119. The message device 136 is stored in memory upon receipt by the browser device 118 (via the browser 119) from the message server device 102. The browser device 118 receives the message device 136 automatically, in the background processing by the browser 119, after the browser 119 has downloaded the website file containing the script device 124 and the corresponding identification device 126 has been returned to the message server device 102, and as the website of the website file loads for display in the browser 119. The message device 136 is concealed during processing in the browser 119; except that the message device 136 can, but need not necessarily, include a message file 142 which represents a message displayable in the website of the website file as part of the website. The browser 119 continues processing the message device 136 through the browsing session of the browser device 118, including during visit of any different or additional websites and/or other actions at the browser device 118 or of the browser 119 while operating in the browsing session.

During processing of the message device 136 by the browser 119 of the browser device 118, the message device 136 (according to design per the message server script 116a for the browser 119 and web file of the script device 124, the database 110 and rule policies 111 for the website corresponding to the web file of the script device 124, and the configuration device 117) selectively captures additional identifiers for the browser 119 and the browser device 118. The additional identifiers can include, for example, website/URL/URI logs and histories, action flags or activities occurring at the browser 119 and/or the browser device 118, keywords or other specific data input to or residing with the browser 119 or browser device 118, further geographic locators, and/or other information relevant to the browser 119 or activities of the browser device 118.

During processing of the message device 136, the message device 136 intermittently (or continuously, periodically or as otherwise programmed) transforms at least certain of the additional identifiers to construct one or more of the call device 138. The call device 138 (and each of them) is a file stored in memory which can be communicated over the network 104 and includes one or more unique campaign article 140 representing the additional identifiers. Because each call device 138 created by the message device 136 includes the unique campaign article(s) 140, and will thereby correspond to particular one(s) of the additional identifiers, each call device 138 may differ in structure, such as per timing of creation, status or state of the browser 119 and/or browser device 118 at creation, activities which have occurred for the browser 119 and/or browser device 118 leading to creation, and/or other aspect(s) of actions, flags, states or indicators of the particular browser 119 and the browsing device 118 (according to particulars of the message device 136). The message device 136 causes the browser 119 to communicate each created call device 138 over the network 104 to the message server device 102.

The call device 138 (and each of them) received by the message server device 102 over the network 104 from the browser 119 is detected and parsed by the extension handler 112 for any campaign article(s) 140. The configuration device 117 operates responsive to the extension handler 112 on receipt of the call device 138, to process the message server script 116a, per the campaign article(s) 140 as input, and perform a look-up in the database 110. According to rule policies 111 of the database 110 and as dictated by processing of the message server script 116a with the campaign article 140 from the call device 138, the configuration device 117 obtains a report of the look-up and transforms the report to create a message file 142. The message file 142 is data stored in memory representing a message displayable by the browser 119. The configuration device 117 directs the message server device 102 to communicate the message file 142 over the network 104 to the browser device 118. The browser 119 of the browser device 119 receives the message file 142 and displays the message corresponding to the message file 142 in, and appearing as part of, the then-current website at the browser 119.

The message server device 102 also includes or communicatively accesses the database 110. The database 110 is a relational database, such as a relational database program stored in memory of the message server device 102. The database 110 contains pluralities of files 110a, 110b (e.g., $file_A$, $file_B$, etc.), each of the files corresponding to and representable as a particular distinct message file 142 processable by the browser 119. As previously mentioned, the database 110 also contains (or is organized or controlled by) a series of rule policies 111 stored in memory. These rule policies 111 are logic circuits, programs stored in memory, or combinations of these, programmed as a series of "IF . . . : YES . . . ($file_\#$), NO (next IF)" cascades, for example:

$IF_1$ . . . : YES ($file_A$) or NO (go to $IF_2$);
$IF_2$ . . . : YES ($file_B$) or NO (go to $IF_3$);
$IF_3$ . . . : YES (file) or NO (go to $IF_4$);
$IF_4$ . . . : YES (file) or NO (go to $IF_5$);
. . . and so on.

These "IF . . . , YES/NO" cascades are pre-programmed for the database 110. In certain embodiments, the cascades are selected (such as from a menu of the message server device 102) by an operator of a website subscribing to obtain service of the system 100, as later further described. Although a simple cascade is above described, as will become apparent throughout, a wide variety of types and cascading of logical determinations, branching, and operations are programmable or configurable as the rule policies of the system 100, and all are included in the embodiments herein.

The rule policies 111 for a particular website serviced by the system 100 are set by prior input to and storage in the database 110. Each particular website serviced by the system 100, for example, can be set with unique rule policies 111 for the website. In certain embodiments, the message server device 102 is accessible to an operator of a website to be serviced by the system 100, via an account set-up website (not shown in FIG. 1) of the message server device 102. The account set-up website allows the operator to register an account for receiving targeted message serving of the system 100 in the operator's website. During account set-up, the website operator can input desired rule policies 111 for the account, such as via a graphical interface of the account set-up website of the message server device 102. Alternately, rule policies 111 can be preprogrammed or otherwise stored or accessed by the message server device 102, with the same rule policies 111 applicable to all (or particular ones or sets of) websites serviced by the system 100. Other account set-up alternatives, as well as other schemes for rule policies, are possible in the embodiments.

In operation, the browser 119 of the browser device 118 downloads to memory of the browser device 118 a web file for a website serviced by the system 100. The web file is, for example, accessed from a web server (not shown in FIG. 1) via communication of the browser 119 over the network 104. The web file, assuming service is provided to the website operator by the system 100 for the website, includes the script device 124. The browser 119 processes the script device 124 during processing and display of the website corresponding to the web file. During processing and display, the script device 124 detects certain features, attributes, and operations of the browser device 118 and the browser 119. For example, the script device 124 detects a network address of the browser device 118 on the network 104, an identity of the website accessed, browser log data, geographic or locational tags for the browser device 118, and/or other information or data unique to the browser device 118 and/or the browser 119.

The script device 124 operating in the browser 119 processes the detected information or data, and generates the identification device 126. In certain embodiments, the identification device 126 includes a location article 128 representing a communicative address on the network 104 for the browser device 118 (e.g., an IP address) and/or other attributes of the browser device 118 (e.g., operational features, elements, and/or other details of the browser device), as determined by the script device 124. The identification device 126 also includes a route article 130, according to protocol and format applicable to the network 104, for controlling the browser 119 and browser device 118 in routing communication of the identification device 126 on the network 104 to the message server device 102. The script device 124 then directs the browser 119 to communicate the identification artifact 126 over the network 104 to the message server device 102 at its communicative address represented by the route article 130.

The message server device 102 receives the identification device 126 from the network 104. The extension handler 112 detects the identification device 126 so received, parses the identification device 126 for portions for the script writer 114 representing unique data or information of the browser 119 and browser device 118, and inputs the parsed result to the script writer 114.

The script writer 114 receives the input parsed result of the identification device 126 from the extension handler 112 and generates the message server script device 116a which is stored in the script storage 116. During processing by the script writer 114, the script writer 114 performs a look-up in the database 110 for the rule policies 111 for the particular the script device 124 (i.e., the particular website) and corresponding to the parsed result of the identification device 126 representing the browser 119 and browser device 118. The script writer 114 obtains a report of the look-up result and creates the message server script device 116a. The message server script device 116a stored in script storage 116 represents the rule policies 111 for the website (i.e., of the script device 124) and unique attributes of the browser 119 and browser device 118 of the identification device 126. The message server script device 116a, thus, represents particular details of the browser 119 and browser device 118, as detected at the browser 119 by the script device 124 and communicated to the message server device 102 per the identification device 126, and also represents the rule policies 111 of the database 110 for the particular website of the script device 124 at the browser 119. Although particulars of the message server script device 116a depend on the certain identification device 126 and rule policies 111 of the database 110, and therefore can widely vary in form for any browser and web file serviced by the system 100, an example of the message server script device 124 includes program stored in memory which on processing with input of variables guides searching of the database 110 for select files 110a, b (etc.) per the rule policies 111. The input variables for the message server script device 124 can include, for example, a campaign article 140 (or data representing it) of a call device 138 (as later described) and a counter (e.g., representing sequence of each next call device 138 received, as later described).

On storage of the message server script device 116a, the script writer 114 directs the configuration device 117 to create the message device 136. The configuration device 117 processes the message server script device 116a and transforms it creating the message device 136. During processing by the configuration device 117, the message server script device 116a is translated to the message device 136 stored in memory, the message device 136 being processable by the browser 119 and communicatable over the network 104. The message device 136 can, but need not necessarily, include one or more message file 142. If any message file 142 is included in the message device 136, as dictated by the message server script device 116a and the rule policies 111 of the database 110 (as set for any particular website serviced), the configuration device 117 performs a look-up in the database 110 for one or more of the file 110a (or 110b, or both, etc.) representing a unique message displayable in the browser 119 in the website of the script device 124. The configuration device 117 then directs the message server device 102 to communicate the message device 136 over the network 104 for receipt by the browser 119.

On receiving the message device 136 by the browser device 118, the message device 136 is stored in memory and processed by the browser 119. The browser displays any message corresponding to the message file 142 (if any) included in the message device 136. The browser 119 otherwise continues processing the message file 142 in the background (i.e., without display) during the browsing session of the browser 119 and the browser device 118.

During processing of the message file 142 by the browser 119, the message device 136 detects (and/or logs) detail or information representing activity, input, accessed website identities, website interaction, state and/or other flags or information of the browser 119 and browser device 118. The message device 136 also can, from time to time as per the message device 136, generate one or more call device 138 in response to such detected activity or information of the browser 119 and browser device 118. Each such call device 138 includes the one or more campaign article 140 representing certain of the detected activity or information of the browser 119 and browser device 118. The message device 136 directs the browser 119 to communicate the call device 138 (and each of the call devices, as the case may be) over the network 104 to the message server device 102.

On receiving any call device 138 by the message server device 102, the extension handler 112 detects receipt of the call device 138, parses the call device 138 for any campaign article 140, and inputs information representing the campaign article 140 to the configuration device 117. The configuration device 117 processes the message server script device 116a (i.e., corresponding to the script device 124) with the information of the campaign article 140 to perform a look-up in the database 110 per the rule policies 111 and corresponding to the campaign article 140. The configuration device 117 obtains the file 110a (and/or 110b, etc.) of the database 110, as per the message server script device 116a and rule policies 111, for the campaign article 140 for the browser 119. The configuration device 117 transforms the file 110a (or other, as applicable) to the message file 142 representing the file 110a, and communicates the web file 142 to the browser device 118.

The browser 119 of the browser device 118 receives, stores in memory and processes the message file 142 displaying a message represented by the message file 142. The message displayed by the browser 119 appears included in and as part of the website then being displayed by the browser 119. Because the message file 142 corresponds to the campaign article 140 of the call device 138 that was previously received by the message server device 102 from the browser 119, the particular message that is displayed from the message file 142 is uniquely targeted to the browser 119 and the browser device 118. For example, if the message device 136 processed in the browser 119 had previously detected a keyword of "car" input to a search engine or access to an auto website during the browsing session, the call device 138 could have indicated this activity to the message server device 102 via the campaign article 140 of the call device 138. Moreover in the example, if the call device 138 was the first such one received by the message server device 102, the configuration device 117, through processing the message server script device 116a and under the rule policies 111, may generate and communicate to the browser 119 one of the message file 142 representing a message displayed by the browser 119 regarding automobiles (or buy it now, or a discount) or any of a wide variety of other possibilities according to the files 110a,b, etc. of the database 110.

In any event, as a browsing session continues by the browser 119, the browser 119 continues to process the message device 136. The operation proceeds with the processing, detection, call device 138 generation at the browser 119 and browser device 118, with subsequent receiving, processing and database 110 look-up, and communication of next message file 142 by the message server device 102. The browser 119 processes and displays each next message file 142 received from the message server device 102, and respective message(s) represented by each such next message file 142 are displayed by the browser 119 as included in and part of the website then-being displayed by the browser 119.

Although, at times, the call device 138 and the message file 142 may each be addressed herein as a single element, the embodiments contemplate and can include pluralities of different ones of the call device 138 and of the message file 142. Each call device 138 communicated by the browser device 118 can include unique one or more campaign articles 140, as dictated by determinations/detections of actions, features, states and other attributes of the message device 136 processed by the browser 119. Each message file 142, because dependent on unique campaign articles 140 of each different call device 138, may also be unique because of the rule policies 111, files 110a,b (etc.) of the database 110, and message server script device 116a corresponding to the original web file processed by the browser 119 containing the script device 124. The rule policies 111, files 110a,b (etc.) of the database 110, and the message server script device 116a corresponding to a particular web file processed by the browser 119 containing the script device 124 are hereafter sometimes collectively referred to as the "unique server elements" for the web file, website and website operator.

Moreover, the embodiments contemplate and include in alternatives a wide variety of types of browsers and browser devices, and can include pluralities of such browsers and browser devices accessing more than one different web file/website of the same or respective different ones of the unique server elements. Each browser and/or browser device may have or include distinct and unique location, operations, features, activities or actions, states, and other characteristics. A browser processing a script device for a particular website communicates to the message server device 102 unique information of the particular browser and browser device; and this information can (and usually will) differ from browser/browser device to different browser/browser device. Because the message server script device 116a is created by the configuration device 117 to be unique for each respective browser/browser device combination, according to location, browser/browser device characteristics, particular website of the script device, and (if according to the embodiment) other details, pluralities of different message server script devices may be maintained in the script storage 116a for any particular website (and account/operator), and also for each respective website (and account/operator) serviced by the system 100.

Additionally, the embodiments contemplate and include that each website (and account/operator) may correspond to a plurality of different files 110a, 110b (etc.) of the database 110, and that the same can be the case for each one of a plurality of websites (and account/operator) serviced by the system 100. The configuration device 117 obtains a select one (or more) file 110a, from among one or more for the website/account, to create each message file 142 served to the browser 119. Because the campaign article(s) 140 of each call device 138 represent the features, attributes, actions, and other characteristics determined by the message device 136 operating in each respective browser/browser device, and the unique server elements correspond to the browser/browser device and also the website (and account/operator), the message file 142 created and served to the browser by the message server device 102 provides a displayed message in the browser of targeted content and information relevant to the user of the browser and the user's interests.

Thus, messages displayed in each browser are targeted for the user's specific interests, expected interests, needs, and other desires, as dictated by the browser and browser device characteristics, to provide more optimal selection, delivery and impression for the user.

Figure 2:
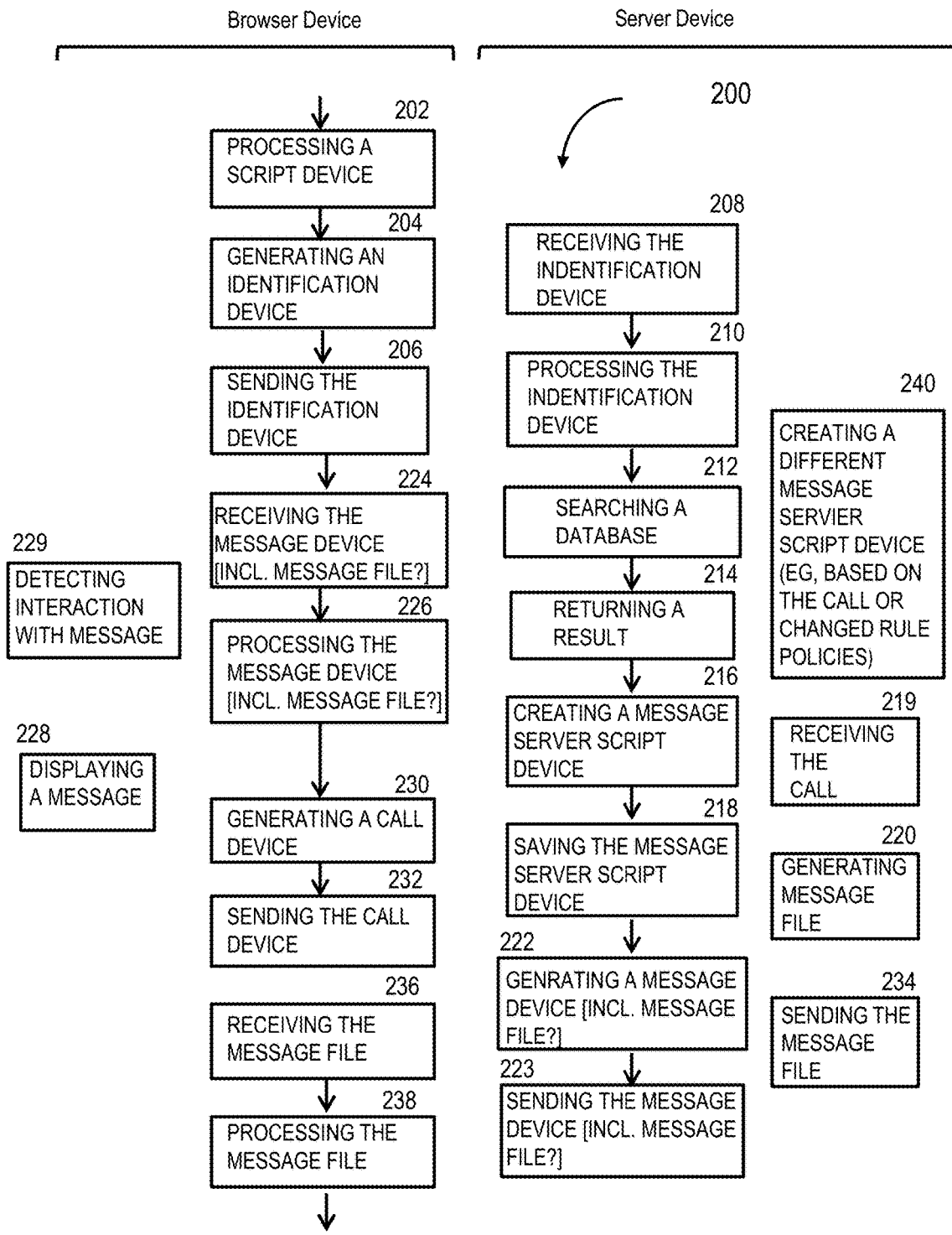
FIG. 2 illustrates a method of serving a targeted content message to a browser, according to certain embodiments of the invention.

Targeted Message Serving Methods:

Referring to FIG. 2, a method 200, for example, performed by the system 100 of FIG. 1, commences with a step of processing 202 a script device by a browser. The script device is, for example, a script program stored in memory, such as a Flash (.swf) file embedded in JavaScript contained in a web file for a web page downloaded from a network by the browser. The step of processing 202 of processing the script program includes determining a communicative location for the browser, for example, a network address (e.g., IP address or MAC identification) or other communicative locator of the browser on the network, and detecting an identifier representing the particular web file (or website) of the script device, for example, a URI/URL address or other network locator for the website download. The step 202 may, but need not, include additional determinations by the script device processed by the browser, as relates to the browser and any computer or other feature of the browser.

In a step 204, the script device processed by the browser generates an identification device, including a location article representing the network address or other locator for the browser on the network and website identifier representing the particular identity of the web file (or website) of the script device. The identification device also includes routing articles for directing the identification device to a particular server device when communicated over the network. The script device processed by the browser directs the browser to send the identification device over the network to the server device in a step 206.

In a step 208, the identification device is communicatively received by the server device. In a step of processing 210 the identification device by the server device, the server device detects that the identification device is received and parses the identification device for location and website identities recognizable to the server device. The location and website identities, respectively, represent the browser's network address or other communicative locator and the website accessed by the browser corresponding to the script device. A step of searching 212 in a database is performed, as directed by the server device, for rule policies of the database corresponding to the location and website identities.

The database is, for example, a relational database program stored in memory and including rule policies and file articles. The file articles represent particular unique messages (or data therefor) for display by the browser. The rule policies are programmed rules stored in memory, which rules uniquely relate specific file articles for the website of the script device. The rule policies, according to desired configuration, can be pre-programmed and stored by the server device and/or the server device (or the server operator) can allow each different website (or the website operator) serviced by the method 200 to dictate some or all of the stored rule policies applicable for the website and particular browser, in each instance. As mentioned in connection with the system 100 of FIG. 1, in certain example embodiments, a website operator desiring service by the method 200, can access an account website (if available) for the server device, in order to set up an account for receiving service by the method 200 for a particular website of the website operator. If the website operator registers an account and includes the script device in the web file for the website, any browser viewing the website will process the script device and receive messages displayed in the browser during the browsing session via the method 200 in embodiments.

One or more rule policies resulting from the searching step 212 is obtained by the server device in a step 214 for the website and browser. The server device processes the rule policies so obtained, in a step of processing 216. In the step of processing 216, a message server script device, for example, a PHP script stored in memory, unique to the identification device and thus the browser (and its location and characteristics), is created by the server device corresponding to the applicable rule policies. The message server script device is saved and stored in memory a step 218.

In a step 222, the server device creates a message device. The message device is, for example, a script program stored in memory, such as a Flash (.swf) file embedded in JavaScript contained in the website of the script device, which was communicated over the network to the browser. In certain alternatives, such as if dictated by the server device per its configuration for any particular website serviced by the method 200, the method 200 may additionally include a step 220 of creating a message file by the server device. The step 220 is performed in conjunction with the steps 216, 218 and/or 222, in such alternative. For example, if rule policies of the database and/or configuration of the server device so dictate, the message file created in the step 220 is communicated to the browser in the step 223 with (or incorporated in, as the case may be) the message device. Any (and each, as applicable) such message file is a script stored in memory, such as a Flash (.swf) file (or other small file) representing a message displayable by the browser. The particular message file represents those file articles of the database which correspond to the rule policies and message server script device for the website and browser. Thus, the message file is uniquely relevant to the particular browser and website. The message file is stored in memory on receipt by the browser, and processed by the browser to display a uniquely targeted message relevant to interests of the user of the browser, as in steps 224, 226 and 228 of the method, now described.

The browser, in a step 224, receives the message device communicated by the server device in the step 223 (and, if applicable, any message file also communicated). The browser processes the message device (together with any message file, applicable) in a step 226. If the message device processed in the step 226 includes any message file, the browser displays a message represented by the message file in a step 228, for example, an output screen of the browser shows the message as a graphical, textual, and or other display of information, media or other content, appearing as part of and included in the web page viewed on the output screen.

The browser continues to perform the step of processing 226 the message device during the browsing session of the browser (even while other web pages and websites are viewed, or as otherwise applies per configuration of the particular message device). During the step of processing 226, the message device detects usage, activities, logs and other events occurring in the browser, including, for example, select interactivity with the message or browser and other features representing characteristics and operations of the browser, communicative link, message interactivity, and history or logs. In response to such detection by the message device, the message device, in a step 230, selectively (e.g., periodically, upon particular event, or otherwise per the message device) generates a call device. The call device (and each of them as may be generated by the message device, from time to time) includes campaign articles representing select ones (or aggregations) of particular and unique features and data of the events, parameters, and other characteristics detected by the message device. In a step 232, the browser's processing of the message device directs the browser to communicatively send the call device to the server device.

In a step 219, the server device receives the call device communicated by the browser. In response to the step 219, the server device, in a step 220, detects the call device as received and parses the call device for identifiers representing the campaign articles. Further in the step 220, the server device processes the message server script for the browser and original website of the script device, with inputs of the identifiers so parsed from the call device, performs a look-up in the database for one or more files according to the processed message server script device and rule policies of the database for the original website, and generates a next message file. This next message file represents the database search result in view of the campaign articles of the call device, as well as the particular features per the particular message server script device for the browser and rule policies for the original website. The message file is a next script stored in memory, for example, again another Flash (.swf) file stored in memory, representing a relevant message displayable by the browser. Because the creating step 220 is guided by the call device and the message server script device, each unique for the particular browser and original website of the script device, such next message file represents a selectively targeted message for the specific browser and the browser user's particular interests. In a step 234, the server device communicates the message file over the network to the browser.

The browser receives the message file in a step 236. In a step of processing 238 by the browser, the browser stores in memory and processes the message file. In a step 228, the browser displays (or otherwise outputs or employs) a next message represented by the message file. In certain embodiments, the step of displaying 228 portrays the targeted content message in a window of a browser program stored in memory and running on the browser, as a graphical, textual and/or other media or content message in a select location of a web page then appearing in the window. The message appears on display as if included in and as part of the website. The method 200 continues during the browsing session of the browser, or as otherwise designed per the message device, by repeating the steps 226, 228, 230, 232, 219, 220, and 234, as per design, for display by the browser of any next message(s) according to the steps.

In certain alternatives, the method 200 can, but need not necessarily, include one or more of a step of creating 240 a next different message server script device to correspond to the original website of the script device and the particular browser for purposes of steps by the server device in delivering message files to the browser. In the step 240, for example, a change to the rule policies of the database, such as a change to programmed priority of the rule policies of the database made by the server device (such as by an operator of the server device or, if allowed per design of the server device, an operator of the website serviced by the method 200 through a web interface to the server device, or otherwise), may initiate the server device to create and store in memory a replacement (or additional or modified) message server script device for the operator's website and particular browser. In other examples of the step 240, design of the server device or programs stored in memory may provide logical operations to be performed by the server device or database to vary the rule policy priorities or change the particular rule policies that may apply. Even further, in the step 240, certain example embodiments may provide alternate rule policies to be automatically or selectively invoked, alone or in combination with other rule policies, such as on occurrence of particular events or characteristics of the browser indicated by the then-current or prior call device (c), history, or other aspects of the method 200 and its steps. If the step 240 is performed in the method 200, the server device saves the new message server script device in the step 218, and this modified message server script device is thereafter employed in the step 220 unless the varying step 240 again occurs. Numerous other alternatives for the step 240 are possible and included.

After the step of displaying 228 in the method 200 is concluded by the browser, several steps are possible. If the browser discontinues the step 226 of processing the message device, then the step of displaying 228 the targeted content message terminates, the message device will not detect browser actions and events, and additional messages will not thereafter be displayed; unless, the method 200 again commences with the step 226. So long as the browser continues the step 226 of processing the message device, for example, while the message device remains stored in memory of the browser (such as during the continued browsing session by the browser), the method 200 selectively returns to the step 230, for example, after a period of time during the processing step 226, after a period of time during the displaying step 228, upon select or desired event or occurrence at the browser or in connection with operations of the browser as detected by the message device, or on other event or detection according to preference set in design of the message device and the method 200.

One such other event according to preference in design of the message device includes a step of interacting 229 with the message. If the message device processed by the browser detects an interaction with the displayed message in the step 229, then the method 200, if the message device then so directs, may return to the step 230 to generate a next call device representing the interaction, as well as any other detected information of the browser and usage applicable per the message device. A user input to the browser, by mouse click or other device (or even hovering the mouse cursor over the message or similar act), is an example of such an interaction in the step 229. In such event of the step 229, the call device resulting from the step of generating 230 can, for example, include campaign articles of the call device representing the detected interaction of the step 229.

The method 200 then continues, returning to the steps of sending the call device 232 by the browser, receiving the call 219 by the server device, generating a message file 220 by the server device (via processing of the applicable message server script device and look-up in the database according to the rule policies), sending the message file 234 by the server device, receiving the message file 236 by the browser, processing the message file 238 by the browser, and, as applicable, displaying a message 228 represented by the message file. The method 200 repeats in such manner for so long as the message device is processed by the browser in the step 226, for example, for so long as the message device is retained in memory of the browser (such as for the duration of the browsing session or as otherwise per the message device stored in the browser). As previously described, messages displayed are uniquely targeted to the particular browser and its characteristics and events, because of the detection via the message device processed by the browser and the communication of each call device representing the detection for use by the server device to serve each next message file. Moreover, the message device processed by the browser continues operating, even as different web pages, websites, and other browsing is performed. The messages are displayed by the browser, via the message device so processed, in any website displayed by the browser (i.e., the original website of the script device, as well as other websites browsed) and appear as included in and part of the websites.

Figure 3:
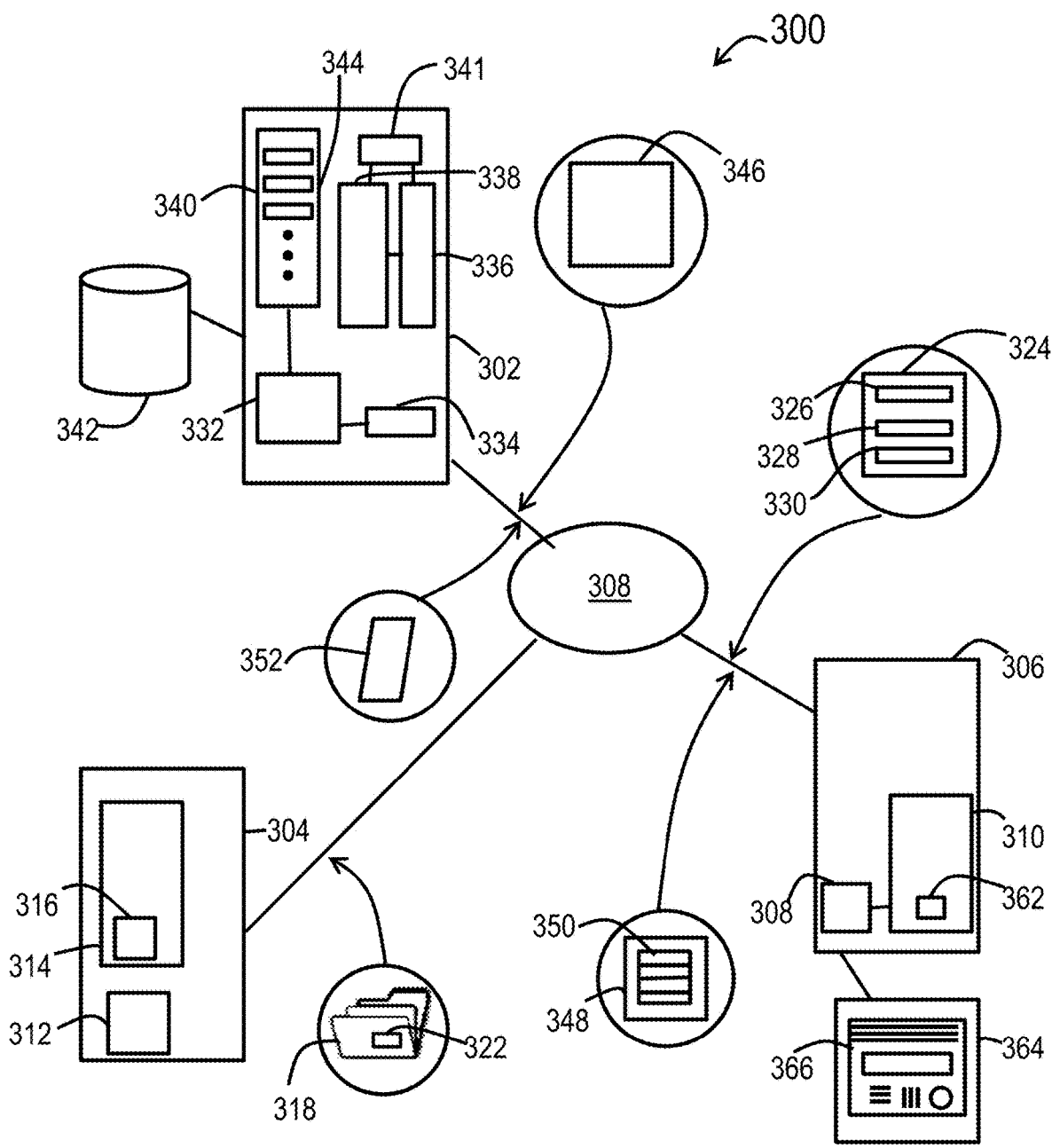
FIG. 3 illustrates a system for targeted content message serving in a client-server website network, according to certain embodiments of the invention.

Targeted Message Serving in a Website Network System:

Referring to FIG. 3, a network system 300 for serving targeted content messages includes a message server 302, a web server 304, and a client 306, communicatively connected by a communications network 308. The message server 302 includes or communicatively connects to a database 310.

The web server 304 is a communicative server device responsive to received communicated requests over the network 308 from other networked devices, such as the client 306. The web server 304, for example, is a server computer or other processing and communication device having or communicatively connected to a web server processor 312 and memory 314. The web server 304 includes or connects to one or more Ethernet adapter, modem, other network connector, or similar communication port or connector (not shown in FIG. 3), for communicative connection to the network 308.

The web server 304 includes a website generator 316, for example, a website program stored in memory 314 controlled by the web server processor 312. The website generator 316 produces a website (or web page) file 318, such as by look-up in a website database (not shown in FIG. 3) for files and data corresponding to a website viewable in a browser program and accessible from the web server 304 on request received from the network 308. The website file 318 includes features 320, such as hypertext markup language (HTML), extensible markup language (XML), codes, text, graphics, audio, video, multimedia and/or similar files or data, and also includes a script device 322, such as, for example, the script device 124 of the system 100 of FIG. 1 or the script device of the method 200 of FIG. 2. In certain exemplary embodiments, the script device 322 is a program stored in memory, for example, a Flash (.swf) file embedded in JavaScript contained in the website file 318 and stored in memory, for processing by a browser program, in embedded form, when processing and viewing a website corresponding to the website file 318. The website file 318 (including the script device 322) is shown in FIG. 3 in transit during communication by the web server 304 over the network 308, in response to a request by the client 306 for a website corresponding to the website file 318.

The client 306 is a communicative device capable of communicating request for the website file 318 and receiving download of the website file 318 from the web server 304 over the network 308. The client 306 can also communicate with the message server 302 over the network 308. The client 306, for example, is a networked computer, such as a desktop, laptop, netbook, smart phone, data cell phone, personal digital assistant, or other processing and communication device, including a client processor 308 and memory 310, capable of requesting and downloading the website file 318 over the network 308. The client 306 may include, for example, various elements, such as a web browser 362 (e.g., a web browser program stored in memory) and a display 364, as well as various input and output devices, storage, other peripherals, and other components or connected devices (not shown). In certain exemplary embodiments, the client 306 processes the web browser program stored in memory to download the website file 318 from the web server 304. For example, a URL for a website represented by the website file 318 is input in browser 362 or browser program, a request for the website file 318 is communicated by the client 306 to the web server 304, the web server 304 communicates the website file 318 to the client 306, and the browser 362 creates a graphic browser window 366 in the display 364 to output the applicable website. The script device 322 of the website file 318 is processed by the browser 362, and is maintained embedded and not displayed in the website shown in the browser window 366.

In processing the script device 322 by the client 306 (e.g., via the browser 362 on receipt of the website file 318 representing the website, and rendering display of the website in the display 364), the script device 322 detects a communicative address, such as an IP address of the network 308 or other locator, for the client 306 operating the browser 362 and an identifier of the website file 318, such as a Uniform Resource Locator (URL) address link. The script device 322 also creates an identification artifact 324, comprised of a location article 326, a route article 328, and a referrer article 330. The location article 326 represents the communicative address for the client 306. The route article 328 represents a communicative address for the message server 302. The referrer article 330 represents an identifier of the website file 318, which may be traced by the message server 302 to the web server 304 (e.g., an IP address of the message server 302, an identification of the website represented by the website file 318 or other identifier), and may also contain other files or data representing particular features, actions, or information of the browser 362 and/or client 306 detected by the script device 322. The script device 322 directs the client 306 (e.g., via operation of the browser 362) to automatically send the identification artifact 324 over the network 308 to the message server 302.

The message server 302 is a communicative server device responsive to received communicated requests over the network 308 from other networked devices, such as the client 306 communication of the identification artifact 324. The message server 304, for example, is a server computer or other processing and communication device having or communicatively connected to a message server processor 332, memory 334, an extension handler 336, a script writer 338, a messaging script program storage 340, and a message file configuration device 341. The message server 304 also includes or communicatively connects to a message database 342. The message server 304 includes or connects to one or more Ethernet adapter, modem, other network connector, or similar communication port or connector (not shown in FIG. 3), for communicative connection to the network 308.

Each of the extension handler 336, the script writer 338, and the configuration device 341 of the message server 302 is a hardware device(s), program(s) stored in memory, or combinations of these. The extension handler 336 is, for example, a script handler program stored in memory 314, such as a JavaScript extension handler program in memory. The script writer 338 is, for example, a PHP script builder program stored in memory 314. The extension handler 336 detects any communications received by the message server 302 over the network 308 comprising the identification artifact 324, parses the identification artifact 324, and inputs data to the script writer 338 obtained from the parse representing the communicative address for the client 306 (i.e., per the location article 326) and the identifier of the website file 318 containing the script device 322 (i.e., per the referrer article 330). The script writer 338, based on the inputs, creates a message script device 344 corresponding to the particular identification artifact 324 and as per prioritization rules of the database 342. The script writer 338 stores the message script device 344 in the messaging script program storage 340.

After the message script device 344 is stored for the particular client 306 and browser 362, the script writer 338 creates a message device 346 and communicates it to the client 306. The message device 346 is stored in memory and processed by the browser 362 of the client 306. The message device 346 detects events and states of the browser 362 and client 306, and generates and communicates call article 348 in response during the browsing session. The message server 302 receives the respective call articles 348 and delivers respective targeted messages to the client 306 for display by the browser 362 in websites viewed in the display 364. Certain features of an exemplary database 400, such as an example of the database 342, are now described.

Figure 4:
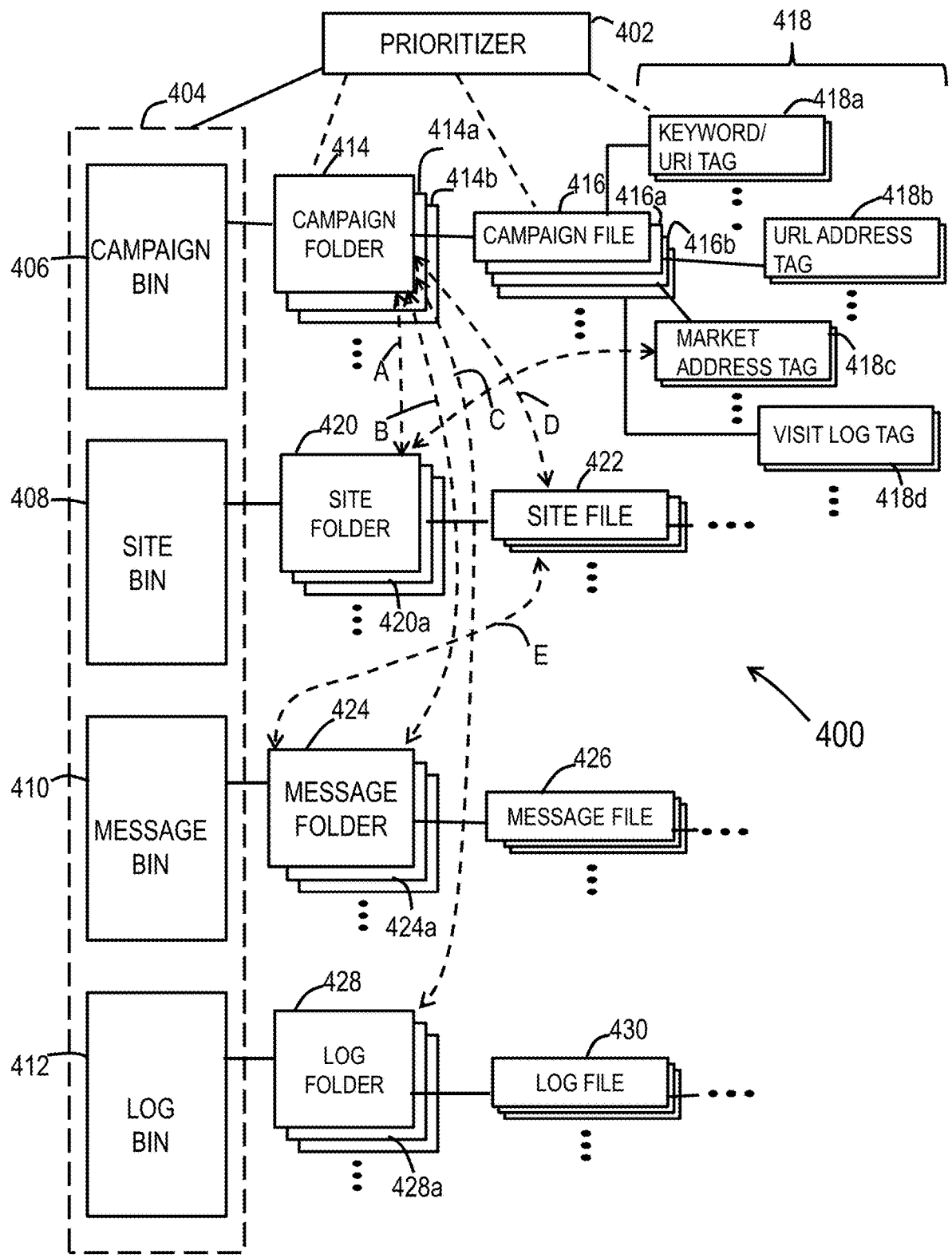
FIG. 4 illustrates a database for targeted content message serving, according to certain embodiments of the invention.

Referring to FIG. 4, in conjunction with FIG. 3, the exemplary database 400 is a relational database, for example, a relational database software program stored in memory. The database 400 includes a prioritizer 402 and at least four bins 404: a campaign bin 406, a websites bin 408, a message bin 410, and a log bin 412. The prioritizer 402 connects to the bins 404. The prioritizer 402, via a processor, such as, for example, the message server processor 332, controls the respective bins 404, and bin constituents as hereafter described, in relative priorities and relationships among and between the bins 404.

The campaign bin 406 maintains at least one campaign folder 414, for example, campaign folders 414a, b, etc. Each campaign folder 414a or b, etc., relates to a particular website(s) (and web file 318 containing the script device 322) serviced by the system 300, for purpose of serving messages to client(s) 306 retrieving the website(s). For example, campaign folder 414a corresponds to the web file 318 for website$_{\#1}$ and campaign folder 414b corresponds to a different web file (not shown in FIG. 3) for website$_{\#2}$ (such as the website of a website operator or source different from that of website$_{\#1}$). Each campaign folder 414a or b maintains at least one campaign file 416a,b, etc. Each campaign file 416a and b, etc., relates to the particular campaign folder 414a and, thus, the particular website (i.e., website$_{\#1}$ and the website file 318 in the example). Each campaign file 416a or b, etc., of a particular campaign folder 414a or b, maintains a particular set of one or more message tags 418a,b,c,d (etc.). Each message tag 418a, b, c, and d represents a particular messaging focus relevant to the particular website (e.g., website$_{\#1}$ and the website file 318 in the example) serviced by the system 300, for the respective campaign file 416. In the example in FIGS. 3 and 4, website$_{\#1}$ corresponding to the web file 318 is available from a particular source (such as a website operator) and regards products of the source, such as automobiles for sale by the source. The message tags 418a-d for the website$_{\#1}$ represent information for automobiles, such as: the message tags 418a represent keywords or words of Uniform Resource Identifiers (URIs) for the website$_{\#1}$ and subjects related to the content of website$_{\#1}$ (such as keywords that might be searched by a browser looking for autos, metatags or ads relevant to autos, or terms in a URI relevant to autos); the message tags 418b represent Uniform Resource Locator (URLs) addresses for related, competitor or other websites for autos; the message tags 418c represent identifiable regions, cities, states, or other geographic and/or network or communicative locations of respective browsers which may view the website$_{\#1}$; and the message tags 418d represent historical viewing/searching or other visit information which may apply to browsers viewing or having viewed the website$_{\#1}$ (e.g., viewed twice or first visit, etc.).

The website bin 408 maintains elements representing web servers serviced by the system 300, such as the web server 304. The website bin 408 includes (or connects) for each web server served by the system 300 to at least one site folder 420. Each respective site folder 420 corresponds to a particular web server, and represents a set of one or more identifiers of the web server. For example, the website bin 408 includes a site folder 420a for the web server 304 containing a network (e.g., IP) address of the web server 304, customer number for the web server 304, or other attributes or data of the web server 304 stored in memory. Each site folder 420 connects to or includes one or more site file 422. As an example, in the case of the particular web server 304, the site file 422 is a set of tokens representing the particular web server 304 for relational operations of the database 400, each token representing a unique feature of the web server 304, such as identity of the web server 304 or the website sourced therefrom.

The message bin 410 maintains message elements, and includes or connects to at least one message folder 424. Each message folder 424 is a software program stored in memory representing a feature of a message, such as, for example, a text, image or media software file or portion stored in memory. For example, the message bin 410 includes a message folder 424a representing certain elements of messages to be served by the system 300 for the website$_{\#1}$ accessible from the web server 304. Each message folder 424 can, but need not necessarily, include or connect to one or more message file 426. Each message file 426 is an element stored in memory employed by the connected message folder 424, for example, a text, graphic, or other feature for the message folder 424. Each message file 426 can additionally include or connect to one or more message items, such as other or further digital file(s) stored in memory, for example, a logo, picture, text, punctuation, or other item.

The log bin 412 maintains account elements stored in memory for respective web servers receiving messaging services from the system 300. The log bin 412 includes (or connects) to at least one log folder 428. Each log folder 428 is an account ledger stored in memory for a particular web server, for example, a historical site visits record, a daily record, a cumulative record, a payment account, an invoice account, rule items established for the web server or website from the web server, and other similar records related to the particular web server. For example, the log bin 412 includes a log folder 428a representing account records for the web server 304 (and the website$_{\#1}$) stored in memory for the web server 304 (and same for other web servers, as applicable, serviced by the system 300). Each log folder 428 can, but need not necessarily, additionally include or connect to one or more log files 430, such as digital file(s) of transactions, interactivity with messages, schedules for messages and operations, and other items for the particular web server and corresponding to particular log criteria.

Figure 5:
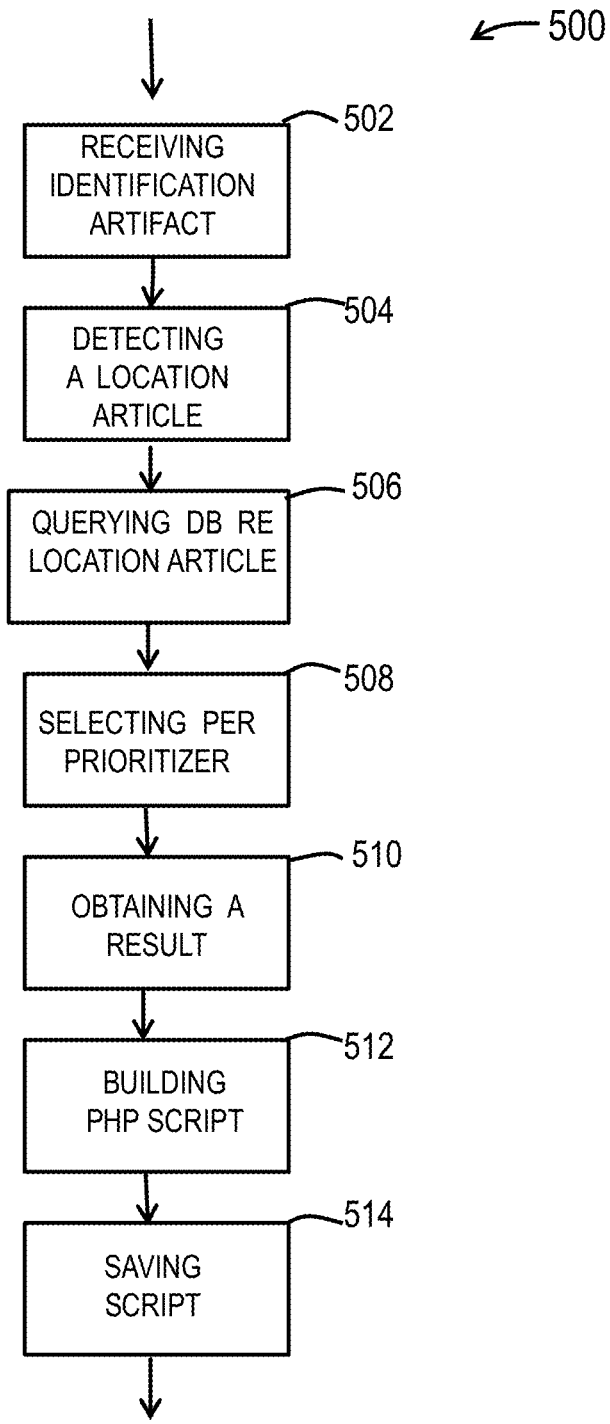
FIG. 5 illustrates a method of creating a message script device in a targeted content message serving system, according to certain embodiments of the invention.

Referring to FIG. 5, in conjunction with FIGS. 3 and 4, a method 500 is performed by the message server 302 in response to receiving the identification artifact 324, to create and store the message script device 344. Once the client 306 retrieves the website file 318 containing the script device 322 and processes the script device 322 in the browser 362 to generate and communicate the identification artifact 324, the method 500 commences with a step 502 of the message server 302 receiving the identification artifact 324. In a step 504, the extension handler 336 detects the identification artifact 324 and parses it to obtain the location article for the client and browser and the identifier of the website file 318 (or data in memory representing these). In a step 506, the script writer 338 receives the location article and the identifier (or representative data) and performs a look-up in the database 400 relative to the location article and the identifier of the website. The script writer 338, in a step 508, additionally determines priority rules of the prioritizer 402, as well as the particular bins 404 and bin constituents (e.g., campaign folder 414a and site folder 420 for the website file 318 and web server 304, as well as related files 416a,b and message tags 418c, etc.), relative to the location article and identifier of the website. In a step 510, the script writer 338 receives results of the steps 506 and 508. The script writer 338, in a step 512, builds the corresponding message script device 344 from the results. The message script device 344 is, for example, a PHP script program stored in memory. The script writer 338 stores the message script device 314 in the messaging script program storage 340 in a step 514.

In a certain particular example of the method 500, for instance, a look-up in the database 400 is directed by the script writer 338 in respect of the location article for the client 306 and the identifier of the website$_{\#1}$ in the steps 506-510. The script writer 338 initiates the prioritizer 402 for the location article and identifier. In the example, the prioritizer 402, according to programming preference (such as to achieve a desired advertising objective of the website operator) can, first, select in the step 508 that look-up proceed initially in respect of the referrer article 330 (i.e., representing the identifier of the website$_{\#1}$) in the site bin 406. If the site bin 406, or its constituents (e.g., site folder 420a or site file 422a, etc.), has relation to the referrer article 330, then the relations are next cross-checked in look-up for the location article 326, such as in the site bin 408 or, alternately, in another of the bins 404, such as the campaign bin 406. If no relation is found in the step 508, the method 500 returns to the selecting step 508 and the prioritizer 508, second, selects that look-up proceed in respect of the location article 326, such as in the campaign bin 406. If the campaign bin 406, or its constituents (e.g., campaign folder 414a, campaign file 416a, and/or campaign tag 418c), has relation to the location article 326, then the relations are next cross-checked in look-up for the referrer article 330, such as in the campaign bin 406 or, alternately, in another of the bins 404, such as the site bin 408. Various examples of possible related constituents of the database 400 are indicated by lines A-F, and the prioritizer 402, in each instance, as directed by the script writer 338, dictates preferential ordering of look-up in the database 400 in the method 500. A wide variety of possible priority/preference orders are possible, in keeping with design of the system 300 and website operator objectives, therefore, this particular operation is merely an example of possible prioritization and others are possible.

Referring back to FIG. 3, in conjunction with FIGS. 4 and 5, in the system 300, upon creation and storage of the message script device 344 via the method 500, the script writer 338 creates a message device 346 corresponding particularly to the message script device 344 at the message server 302. In certain embodiments, the message device 346 is a script program stored in memory, for example, such as a Flash (.swf) file (or other small file) embedded in JavaScript and processable by the browser 362 of the client 306. The message device 346 is communicated by the message server 302 to the client 306. At the client 306, the browser 362 of the client 306 processes the message device 346, in embedded form and hidden from display. During processing of the message device 346 by the browser 362 of the client 306, the message device 346 detects actions and states of the client 306 and browser 362.

The message device 346, because corresponding particularly to the message script device 344 at the message server 302, further corresponds to applicable prioritization orders and constituents of the database 342 for the particular website of the script device 322. Moreover, the message device 346 additionally corresponds to the particular client 306 and browser 362, because created by the script writer 338 to particularly correspond to the location and website identity represented by the identification artifact 324 received by the message server 302 from the client 306. The message device 346 is communicated by the message server 302 to the client 306, saved in memory of the client 306, and processed by the web browser 362 of the client 306.

During processing of the message device 346 by the web browser 362 of the client 306, the message device 346 continues collecting and logging in memory certain details representing actions and events of the web browser 362 and client 306, for example, keywords searched, historical websites visited, market geography, and visits to websites of or related to the web server 304 and website file 318. The message device 346, upon trigger according to design of the message device 346, creates a call article 348. The call article 348 may include one or more campaign artifact 350, such as, for example, a particular keyword, an interactive action detected by the web browser 362, a number, such as site visits or time-out, or other similar item. Each campaign artifact 350 represents an input parameter corresponding to the particular message script device 344 (at the message server 302) for the client 306. The call article 348 is communicated, upon occurrence of the trigger, to the message server 302, by operation of the message device 346 in the web browser 362. Periodically, and from time to time, one or more call articles 348, each differing as to the one or more campaign artifact 350 representing actions or events as may then be applicable for the browser 362 and client 306, may be communicated by the message device 346 in this manner.

Each call article 348 received by the message server 302 over the network 308 from the client 306 is detected by the extension handler 336 and prepared for the script writer 338. The script writer 338 processes the call article 348 (or relevant features or attributes represented thereby for the client 306 and browser 362) via the particular message server script 344 for the client 306, browser 362, and website file 318. The script writer 338 directs a look-up in the database 342, such as for constituents relevant to the browser 362 and client 306 according to the call article 348, particular message server script 344, and per the prioritizer 402 and rule policies of the database 342 (including, for example, any message items of the message bin 410 as per the exemplary database 400). Based on look-up results of the database 342, the script writer 338 processes the message server script 344 to create a message artifact 352, for example, a Flash (.swf) file stored in memory and of form for communication over the network 308 to the client 306 for processing by the browser 362.

The message server 302 communicates the message artifact 352 to the client 306. On receipt by the client 306, the web browser 362 stores the message artifact 352 in memory and the message device 346 processes the message artifact 352 for display as a message. On processing the message artifact 352, a uniquely targeted content message is displayed in a select location of the website corresponding to the website file 318, in the browser window 366 for the website. The message appears in the website as part of and as though included in the website.

Figure 6:
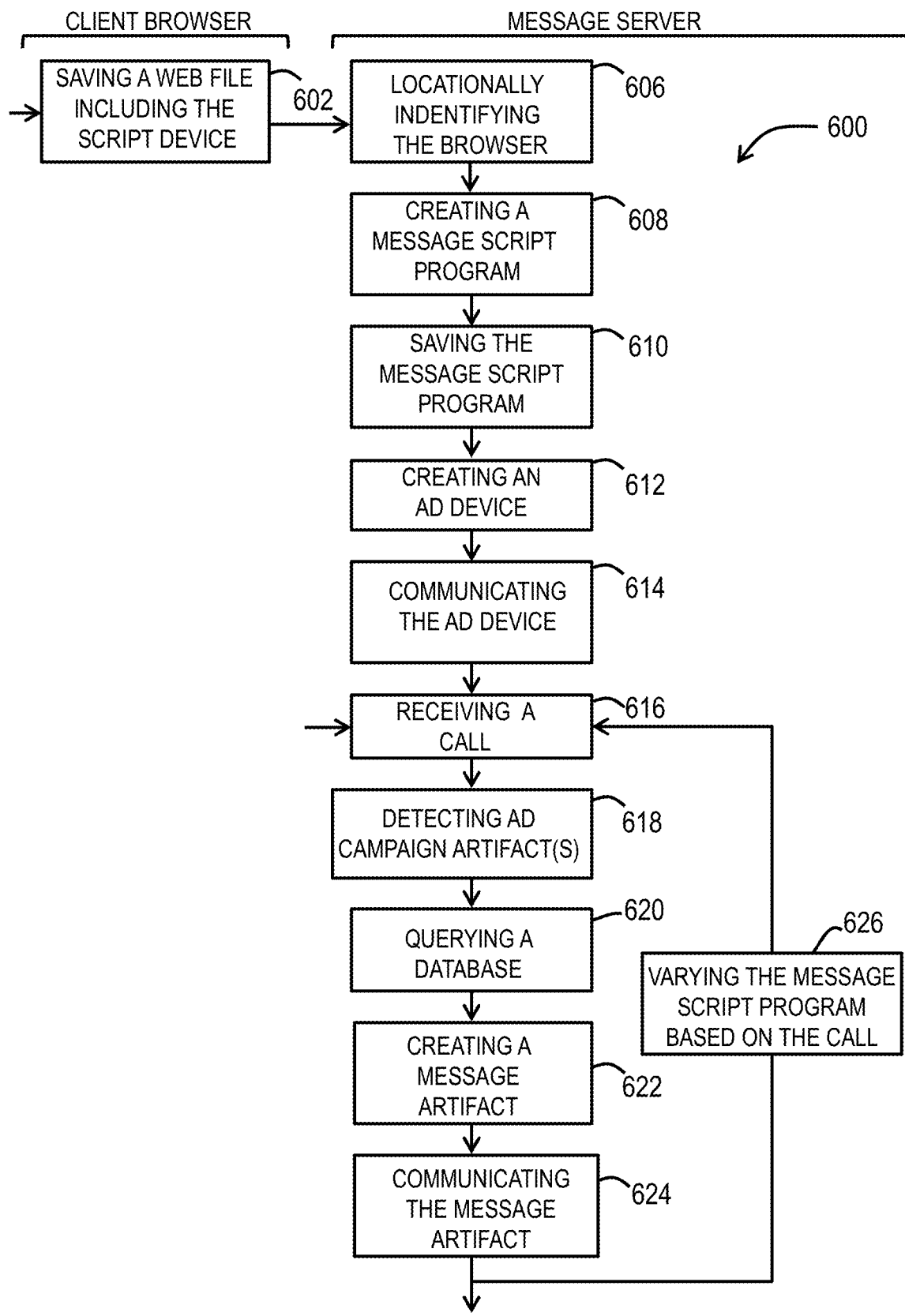
FIG. 6 illustrates a method of serving a targeted content message to a browser viewing a website in a client-server website network, according to certain embodiments of the invention.

Example Embodiment of the Client-Server Network System:

Referring to FIG. 6, in conjunction with FIGS. 3-5, a method 600 of serving targeted content messages in a client-server network, such as the network 308 of the system 300 of FIG. 3, includes a step of serving 602 a website file, including the script device 322 (for example, the website file 318), by a web server, such as the web server 304, over the network to a web browser, such as the web browser 362 processed by the client 306. The script device 322 is embedded in the web file and is not displayed in a browser window of the web browser, when displaying a website corresponding to the website file. An example embodiment of a script device is a script program stored in memory by the web browser, such as the following:

```
<script type="text/javascript" src="http://statistics.vmdataservices.com
/js/smartcontentlaunch-
12gubr157ksx.js?confirmkey=46&requestkey=19"></script>
```

Other script devices, including hardware devices, software programs stored in memory, and combinations, are possible.

The method 600 continues in a step 606 of locationally identifying the web browser. In the step 606, the web browser processes the script device 322, detects a communicative address (or other location) of the web browser and an identity of the website of the script device 322 (or of the web file 318, the web server 304, or other identifier of source), and communicates to a message server the communicative address or location, together with the identity of the website (or communicates an article or file representing such address/location and identity). For example, the web browser processes the script device 322 during processing of the website file by the web browser, and the web browser sends the communicative address, together with an identifier of the website (or representative file or article), to the message server over the network. The communicative address or location of the web browser is, in certain example embodiments, a file or article representing an IP address of the network for the web browser, and the identifier of the website file is, for example, a file or article representing a URL of the corresponding website accessible from the web server.

In a step of creating 608, a message script program stored in memory of the message server is created by the message server, such as, for example, via the script writer 338 based on the communicative address of the web browser and identity of the website file. The message script program is created based on direction of the message server and a database connected to the message server, for example, the script writer 338 (e.g., according to design or configuration of the script writer 338) together with the prioritizer 402 and database 400, is a PHP script builder program stored in memory of the message server and input parameters to the program represent priorities and constituents of the prioritizer 402 and database 400 and the communicative address and identity from the web browser. In certain example embodiments, such as in the system 300, the script writer 338 creates a PHP program stored in memory, which PHP program is based on four basic rules: a URI Rule, a Content Interest Rule, a Market Focus Rule, and a Site Visits Rule. Each of these rules is an element referred to as the tags 418 of the exemplary database 400 and also has cross-relevance to various other constituents of the database 400.

URI Rule:

The URI Rule provides parameters for the creating step 608 related to keyword/URI tags 418a for content of message items served and available to be served by the message server, such as message artifacts, in whole or part, logos, colors, text, content, configurations for messages in various types of web browsers, and related items of the exemplary database 400 such as those of the message files 424 and message folders 426.

Content Interest Rule:

The Content Interest Rule provides parameters for the creating step 608 related to URL addresses tags 418b of websites of the network, such as addresses of other websites browsed by the web browser which contain particular data or information, web browser activity as to those other websites, and other aspects of browsing activity, and related items of the exemplary database 400 such as those of the website files 420 and website folders 422.

Market Focus Rule:

The Market Focus Rule provides parameters for the creating step 608 related to geographic location tags 418c in respect of communicative address or other locator of the web browser, such as geographical terms, items, website features, network address, and related items of the exemplary database 400 such as those of the campaign files 414, the campaign folders 416, the website files 420 and the website folders 422.

Site Visits Rule:

The Site Visits Rule provides parameters for the creating step 608 related to visit log tags 418d of the web browser to the website, such as number of return site visits to the website, historical site interactions of the web browser, and similar website- and web browser-related items, and related items of the exemplary database 400 such as those of the campaign files 414, the campaign folders 416, the website files 420 and the website folders 422, as well as the message files 424, the message folders 426, the log files 428 and the log folders 430.

These Rules are employed as variables by the script writer 338 to create the message script program corresponding to the particular identification article of the web browser, and also to create the corresponding message device for communication to the web browser in respect of the particular message script program for the web browser. The Rules are also employed as variables by the configuration device 341 in database 400 look-up operations, priorities accorded by the prioritizer 402 and selection of message items of the database 400 to be served in response to call articles received from the browser.

In a step 610, the message script program is saved in storage of the message server. The message script program provides all pertinent details required for configuration of messages for the client. In a step 612, the message script program creates a message device, such as the message device 346, corresponding to the message script program. The message server communicates the message device to the web browser in a step 614. An example embodiment of a message device is a script program storable in memory by the web browser on receipt from the message server, such as the following:

```
<script type="text/javascript" language="JavaScript">
document.write(unescape("%3Cscript
src='http://www.getsmartcontent.com/getSmartContent/MacTags.js'
type='text/javascript'%3E%
3C/script%3E"));
document.write(unescape("%3Cscript
src='https://www.getsmartcontent.com/getSmartContent/getSmartContentPreL
oader22.gif?
confirmkey=116&reqestkey=67&samp="+
escape(document.referrer)+"&nocag="+new Date( ).getTime( )
+"&new='type='text/javascript'%3E%3C/script%3E"));
</script>
<script type="text/javascript" language="JavaScript">
var hasReqestedVersion = DetectFlashVer(requiredMajorVersion,
requiredMinorVersion, requiredRevision);
if (hasReqestedVersion) {
    document.write('<object type="application/x-shockwave-flash" data="'+
GSCMhbv +'" id="'+ GSCDDname +'" width="'+ GSCWid +'" height="'+ GSCHeig
+'"> <param name="movie" value="'+ GSCMhbv +'" /> <param
```

-continued

```
name="allowNetworking" value="all" /><param name="allowScriptAccess"
value="always"
/> <param name="wmode" value="transparent" /> <param
name="allowFullScreen" value="true"
/> <param name="swLiveConnect" value="true" /> <embed src="'+ GSCMhbv
+'" wmode="transparent"
allowScriptAccess="always"></embed> </object>');
    } else {
document.write(altC);
}
</script>
```

Other script devices, including hardware devices, software programs stored in memory, and combinations, are possible.

The message device is received by the web browser, stored in memory and processed during web browser operations in the browsing session. The message device, as processed by the browser, collects and logs details of the web browser, such as particular interactivity or action of the web browser with website(s) and/or other states or detected features. Upon triggering occurrence, according to design of the particular message device, the message device automatically directs the web browser to send a call to the message server over the network. The call is files or articles representing one or more ad campaign artifact 350.

In a step 616, the message server receives one of the calls from the web browser. The message server detects the one or more ad campaign artifact 350 of the call in a step 618. In a step 620, the message server looks-up in the database, such as the exemplary database 400, as directed by the configuration device 341 for the particular message script program for the web browser and original website, to determine relevant constituents of the database (such as bins 404, folders 414, files 416 and/or message tags 418) corresponding to the one or more ad campaign artifact 350, such as may be further dictated by the prioritizer 402 of the database 400. Based on results of the step 620, the message server in a step 622, for example, via operation of the configuration device 341 in the system 300, creates a message artifact, such as the message artifact 352 of the system 300. The message artifact so created, thus, corresponds uniquely to the web browser and website, including, for example, the particular actions, events, states, website then viewed, and history, among other detected features, for the web browser.

In a step 624, the message artifact is communicated by the message server over the network to the web browser. At the web browser, the message artifact is stored in memory and processed by the web browser to construct a message displayed in respect of the particular message artifact. The message appears as part, and in select location, in the applicable website then displayed in the browser window of the web browser.

The steps 616-624 of call and response with next respective message artifact are continued for the web browser during the browsing session, or as otherwise dictated per design of the particular message device and the message script program from the step.

In certain alternatives, the method 600 additionally includes a step 626 of varying the message script program 626 by the message server. The step 626 is performed, for example, in response to receipt by the message server of a particular call, which (if the message server is so configured) is recognized by the message server as conforming to a pre-programmed (or change of program) instruction in memory to initiate a change to the message script program 626 then maintained by the message server. In the step 626, the message server varies the message script program then saved in memory, as per the pre-programmed (or change of program) instruction in memory. An example of the method 600 including the step 626 includes a change made to priority rules of the database or to the prioritizer. Examples of instances in which such change may be made include: implementation of different configuration device or prioritizer by the message server operator, change to database constituents (such as addition of message items or change to focus of objectives for messaging), or other. In certain embodiments, the step 626 may be performed because of implementation of change to the message server or database by an operator of the message server. In other embodiments, the step 626 may be performed because of changes implemented by an operator of a website served by the method 600, such as the operator of the website inputs changes to a control panel website (provided by the operator of the message server) for the method 600 as to the particular website.

In further operations, the method 600 as to each website serviced by the message server continues with the step of receiving 616 a next call of the respective website, and proceeding through the steps 618, 620, 622, 624, and, if applicable, step 626, for each such call.

Example: An example of the embodiments is a targeted content message serving provider. The provider, via a message server and database of the provider, serves message devices and message artifacts for display of targeted content messages in websites viewed by a browser from a network. An original website serviced by the message serving provider is viewed by the browser by downloading a website file corresponding to the original website. The website file includes a script device (specific to the message server of the messaging serving provider, and programmed as part of the website file by the website operator). The website file, including the script device, is stored in memory and processed by the browser on download. The script device, as processed by the browser, detects features of the browser for generation of an identification artifact for the browser. The features detected represent at least a communicative address or location of the browser and an identity of the original website of the script device. The script device directs the browser to send the identification artifact to the message server over the network.

In response to receiving the identification artifact from the network, the message server creates a respective messaging script stored in memory for the browser, corresponding to the identification artifact, specifics representing the browser, designed priorities for messaging, database elements, and other programming or features of the message server. The message server also creates the message device corresponding to messaging script and communicates the message device over the network to the browser. The browser receives the message device, stores it in memory, and processes it.

The message device so processed detects events, states, and activities of the browser. Per the particular message device, the message device directs the browser (periodically, intermittently, or otherwise per the message device) to send one or more call, each call representing at least certain of the detected events, states and activities. The call(s) is communicated over the network to the message server. The message server responds to calls of the browser by processing the respective message script for the browser, performs a look-up in the database (including according to priorities or rules applicable to the database and constituents of the database), creates one or more message artifact for each call and unique for to what the call represents of the browser, and serves the one or more message artifact to the browser over the network.

The browser receives the message artifact, stores it, and processes it, to display a uniquely targeted message in and as part of the then-viewed website displayed by the browser. The uniquely targeted message, because relevant to the specific browser events, activities, and states, is targeted to the browser user's interests at the particular point in time.

In certain embodiments of the example targeted content message serving provider, the provider additionally creates and makes available to website operators a provider website for the targeted content message serving. Customers (e.g., companies and product/service vendors who are website operators) access the provider website to set up a customer account to receive targeted content messages served by the provider to appear in the customer's website when viewed in a browser and also other websites viewed by the same browser during a browsing session. The customer, on setting up an account for payment and records purposes of the message serving provider, creates a 'Campaign' for the message server for the particular customer website, by defining the size of the message to be displayed in the customer's website and then directing 'Rules' for the Campaign. Customers also input specifics of messages which are to be displayed for the customer in websites viewed by browsers originally accessing the customer's website. The message specifics can include message files, message text, images, graphics, media, and the like. The customer then includes a script device, provided by the message serving provider, in the website file for the customer's website of the Campaign.

The Rules for each Campaign of a customer correspond, in the example, to a URI Rule, a Content Interest Rule, a Market Focus Rule, and a Site Visits Rule, as previously described with respect to FIGS. 3-6. In certain example embodiments, the Campaign is built on rules and conditions that determine who, what, when, where and how to serve targeted content messages. The Campaign is easily created and managed through the customer's interaction with the provider's website. The Campaign, itself, can include targeted content messages served to provide discount offers, images, overview copy links to landing pages with additional information on the content or messages, and numerous other possibilities. The Miles for the Campaign have objective of targeting individuals and audiences who view the customer's website over the Internet through a web browser. Several specific examples of possibilities for the Rules are as follows:

URI

The URI rule allows a customer to enter a list of keywords related to the specific content of messages that the customer desires to be served for display in the customer website. When a viewer retrieves the customer website in a browser, if the viewer has searched for one of the keywords, the provider serves a message of the customer containing the specific content of related keywords is displayed in the customer website.

Example: An online seller of camping gear is overstocked on a particular type of camping tent and needs to reduce the inventory. This seller can create a campaign using the URI rule and enter a list of related keywords—e.g., tent, camping gear, sleeping bags, backpacks. When a viewer who has searched one of the keywords (of the URI rule) retrieves the seller site in a browser, the provider serves an applicable message of the customer displayed in the customer website, such as one advertising a sale on the tent in question.

Content Interest

The Content Interest rule allows a customer to enter a list of URL addresses of websites containing related information to the desired messages. When a viewer retrieves the customer website in a browser, the provider serves a message of the customer containing content with relation to the related information of the other websites, for display in the customer website.

Example: An international online liquidator of excess inventory sells everything from area rugs to wedding rings and has a desire to push a particular brand of H-ID television. This liquidator can create a Campaign using the Content Interest rule and submit site URLs specializing in HD televisions, home electronics and even specific URLs within a site, such as the HDTVworld section of CNET. When a viewer retrieves the customer website in a browser, if the viewer has previously retrieved the website of one of the URLs in the browser, the provider serves a message of the customer relevant to the particular HD television, for display in the customer website.

Market Focus

The Market Focus rule allows customers to target viewers of the customer's website focusing on specific geographic locations. When a viewer retrieves the customer's website in a browser, the provider serves a message of the customer relevant to the individual location of the viewer, for display in the customer website.

Example: A national restaurant chain has thousands of locations across the nation. Yet, within each market, certain franchises of the chain may offer different specials based on the season, food supply and even the time of day. The restaurateur customer can create a Campaign using the Market Focus rule to target customers within the geographic area of relevant franchise. When a viewer retrieves the customer's website in a browser, if the browser has a particular geographic location, such as Seattle, Wash., the provider serves a message of the customer of menu information and daily specials offered by the nearest franchise to the browser, such as a location in Seattle (and not Dallas, Tex.).

Site Visits

The Site Visits rule allows customers to target viewers of the customer's website focusing on the number of times a viewer's browser has retrieved the customer's website. When a viewer retrieves the customer's website in a browser, the provider serves a message of the customer for display in the customer website, relevant to the number of times the customer website was retrieved by the viewer's browser within a defined timeframe.

Example: An online retailer of women's shoes is attempting to increase sales over the prior quarter. However, online shoe shoppers have been hesitant to purchase shoes without fitting them before the purchase. The retailer customer can create a Campaign using the Site Visits rule to track the number of times a viewer has retrieved the customer website without making a purchase. After three trips to the online store of the website, for example, the provider serves a message of the customer advertising free shipping and free return shipping if the viewer is not satisfied with the purchase. Additionally, after six trips to the online store, for example, the provider serves a message of the customer offering an additional discount, such as 10% off on pricing. Even more, after nine trips to the online store, for example, the provider serves a message of the customer offering a buy-one, get-one-free opportunity.

Prioritize, Mix & Match Content Campaign Rules

Customers of the provider's targeted content message serving can additionally prioritize the rules for order of application in serving messages via the message server and database. For example, the Market Focus rule may be assigned first priority by the customer via the provider website, and if the viewer of the customer website is not within a particular geographic area under the rule, then a second in priority rule assigned by the customer, such as the Site Visits rule (or other rule), applies. The customer, via the provider website, can also mix and match Campaigns to combine multiple rules at any time, in which event the provider's message server operates according to the rule combinations to serve targeted content messages displayed in the customer website that are of most relevancy to the customer's objectives and viewer's interests.

Example: A brick-and-mortar and online wine chain has too many bottles of French Cabernet in its Charlotte, N.C., stores, and too many bottles of Napa Merlot in its Portland, Oreg., stores. By combining the Market Focus rule and the URI rule, the wine chain customer can create a combination of Campaigns to target respective area viewers retrieving the customer's primary website and exhibiting interest in these specific wine varietals. To increase conversion odds (i.e., sales vs number of site visits) further, the chain can employ the Campaigns to leverage the Site Visits rule, by ensuring that the provider's message server serves messages of the customer of an introductory offer for viewers who have retrieved the customer website three times but not made a purchase.

Of course, numerous variations, additions and substitutions, are possible in the Campaign. Rules for the Campaign, and messages of any particular customer and as permitted by the message serving provider.

Figure 7:
FIG. 7 illustrates an exemplary web page for creation of a targeted content message serving campaign, according to certain embodiments of the invention.

Referring to FIG. 7, an exemplary web page 700 of a provider website for Campaign creation by a customer of the message serving provider, is an XML page capable of receiving customer input over the network to the page, for creating the Campaign of the customer. The web page 700 connects to the database via the message server. The web page 700 is positioned on a "Content" folder 702.

Figure 8:
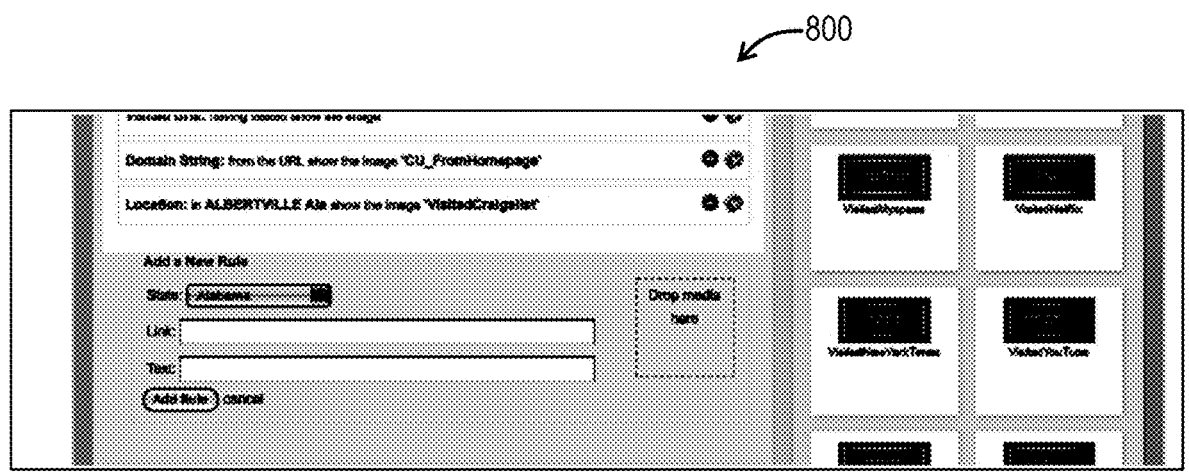
FIG. 8 illustrates a portion of the web page of FIG. 7 of a rule assignment process for a targeted content message serving campaign, according to certain embodiments of the invention.

Referring to FIG. 8, an excerpted portion 800 of the Content folder 702 of the web page 700 of FIG. 7 illustrates the process of a customer interaction with the web page 700 to enter a Market Focus rule according to specific messages of the customer in the Campaign. For example, the rule is created through the customer's input of a desired message (including any text, graphics, media, etc.) from the "Content" frame of the web page 700, such as by click and drag of a mouse, and input of text information, such as by keyboard, in the blanks.

Figure 9:
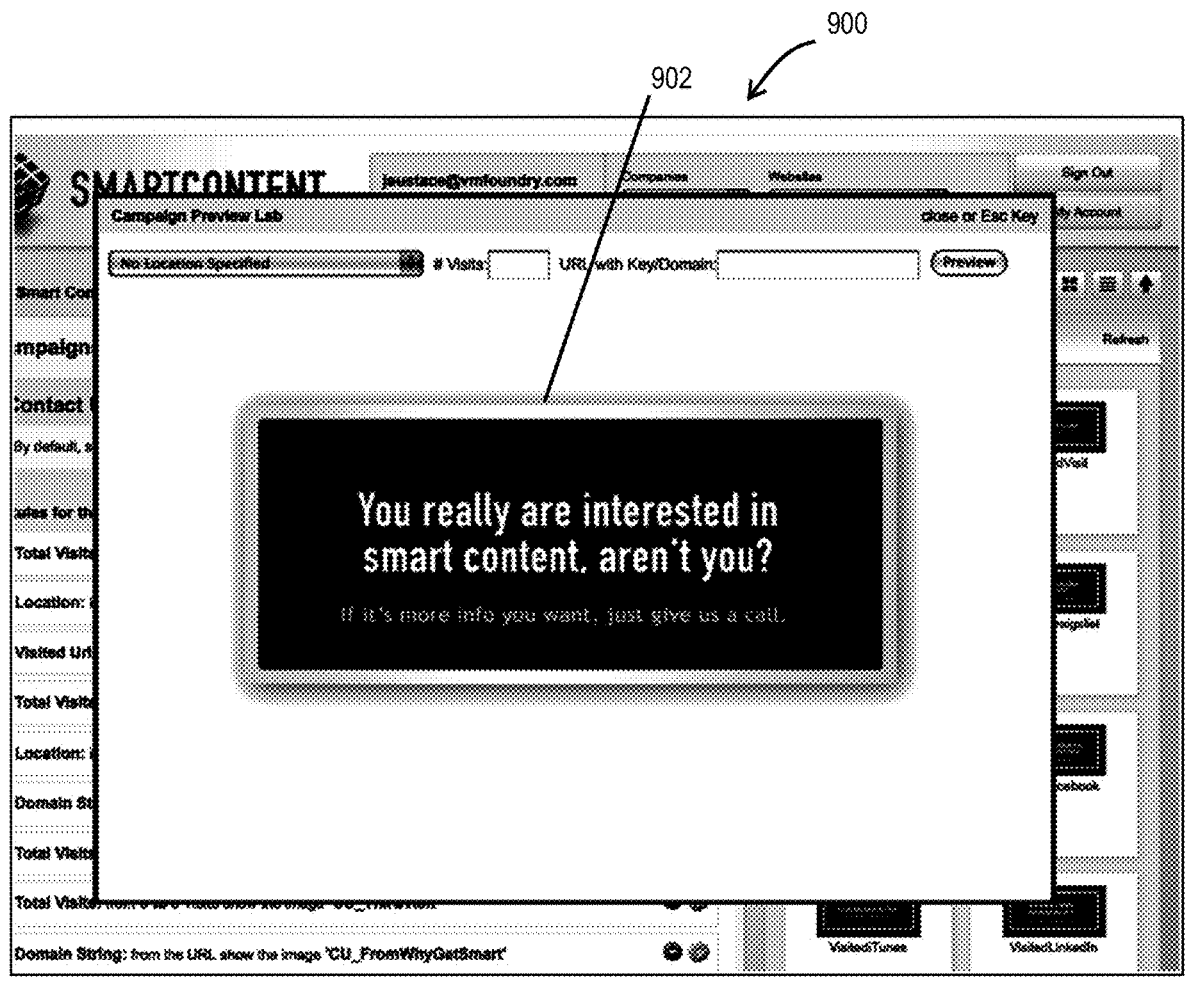
FIG. 9 illustrates a preview of a targeted content message to be displayed in a website viewed in a browser, according to certain embodiments of the invention.

Referring to FIG. 9, a preview 900 of the desired message entered by the customer in the excerpted portion 800 of FIG. 8 is illustrated. The preview 900 is automatically displayed via the provider's website upon the customer's specification of location, number of visits and/or other rule information for the Campaign. The particular desired message, as it will be displayed in the customer's website (or other website thereafter) viewed in a browser, when served by the provider's message server, is shown as the message 902.

Figure 10:
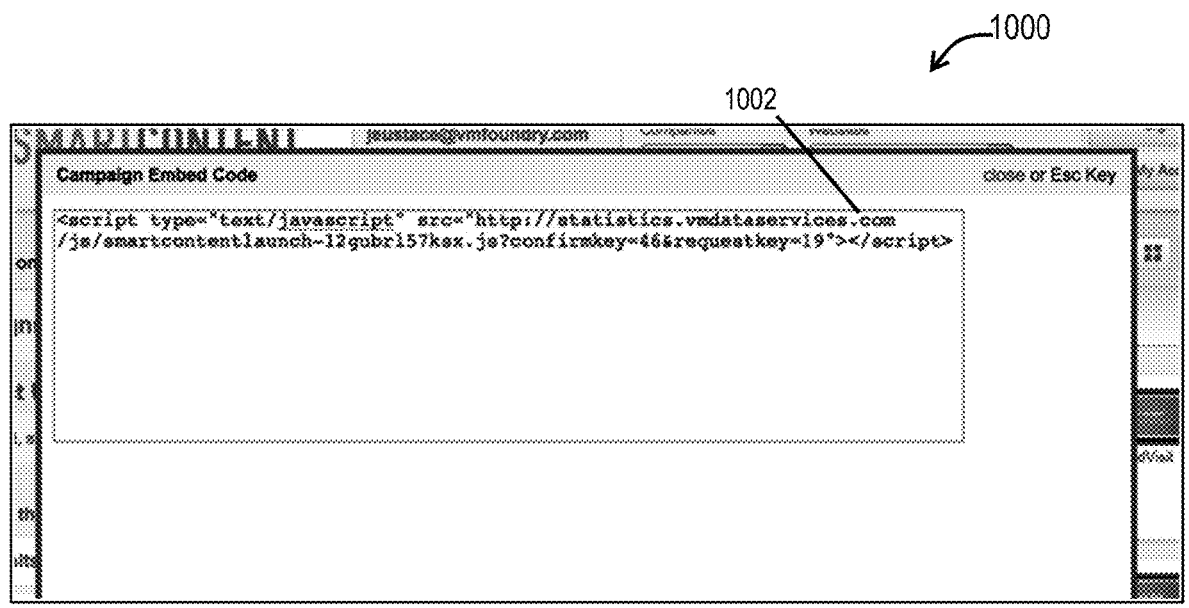
FIG. 10 illustrates an example embed script for a script device for a website to receive targeted content messages displayed in the website, according to certain embodiments of the invention.

Referring to FIG. 10, an embed code display 1000 of a script device 1002, such as representing a script program stored in memory, which must be embedded in the customer's website is illustrated. The script device 1002 is an example representing the script device 342 of the system 300 of FIG. 3. The customer must include the script device 1002 in the website file for the customer's website, in order to receive targeted content message serving provided by the message server of the provider. As previously described, the script device detects at least location of the browser and identity of the customer website accessed by the browser, creates the identification artifact representing the location and identity, and directs the browser to communicate the identification artifact to the message server.

Figure 11:
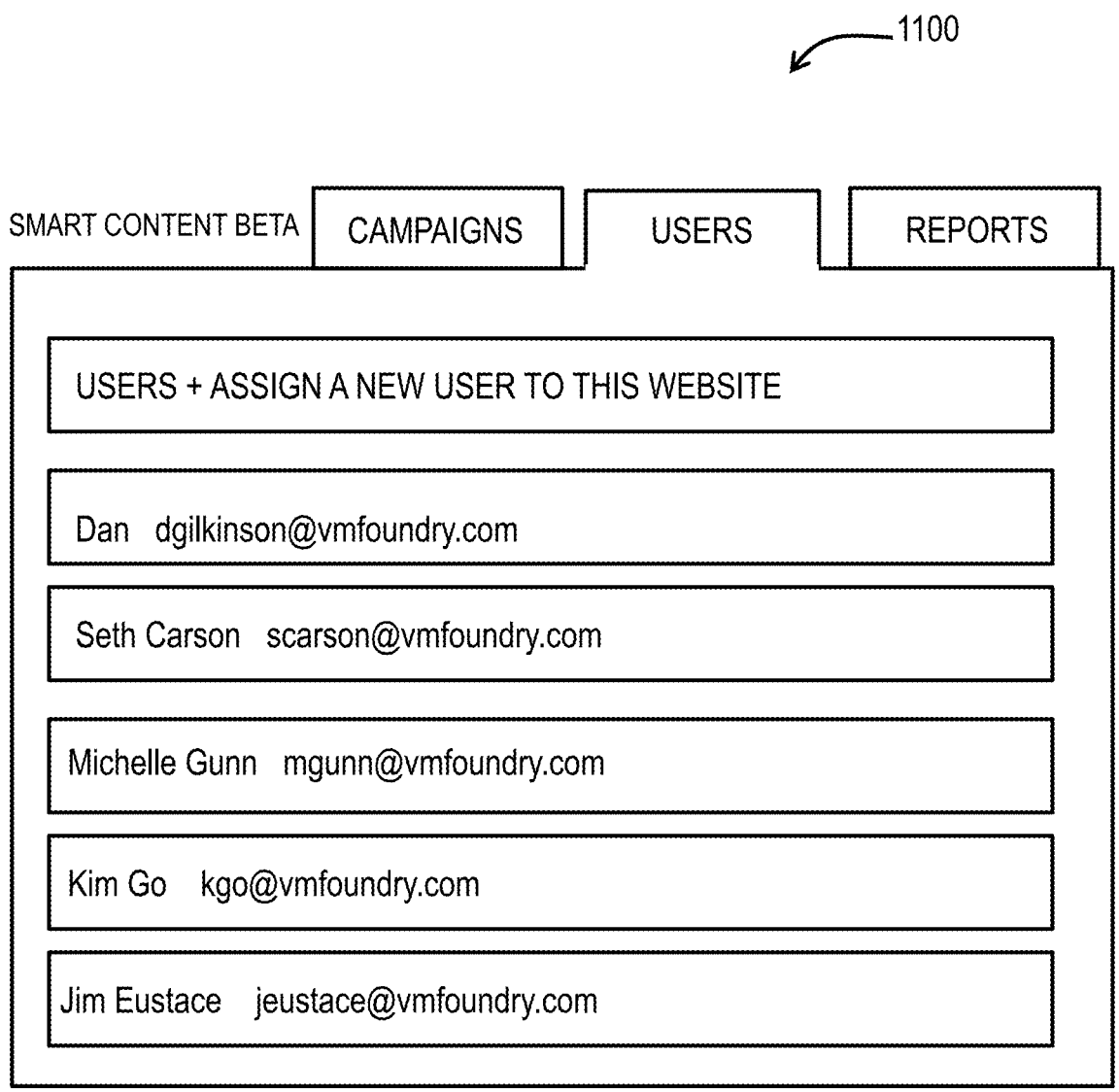
FIG. 11 illustrates a user folder of the web page of FIG. 7 for administration of a targeted content message serving campaign, according to certain embodiments of the invention.

Referring to FIG. 11, a "Users" folder 1100 of the web page 700 illustrates individual administrators designated by the customer having access to the provider's website for creation of the Campaign and viewing or related provider website pages. The provider's web page 700 allows user permissions to be assigned, such as in order to allow customer employees, ad agencies, or others authorized by the customer to create and edit the Campaign and to access related information available from the provider website regarding the Campaign.

The database of the provider, together with the provider's website, via customer input, administers the Campaign, as well as customer actions in connection with the Campaign. The database, such as the exemplary database 400 of FIG. 4, maintains the specific Campaign(s) for the customer and customer website, as well as any others for respective customers and customer websites serviced by the message serving provider. In addition to Campaign creation and administration operations, the database maintains a log bin 412 for tracking and reporting of respective Campaign activities, including maintaining logs of customer usage, viewer retrieval of customer sites receiving the targeted content message serving of provider, and other customer and viewer data stored in memory.

Figure 12:
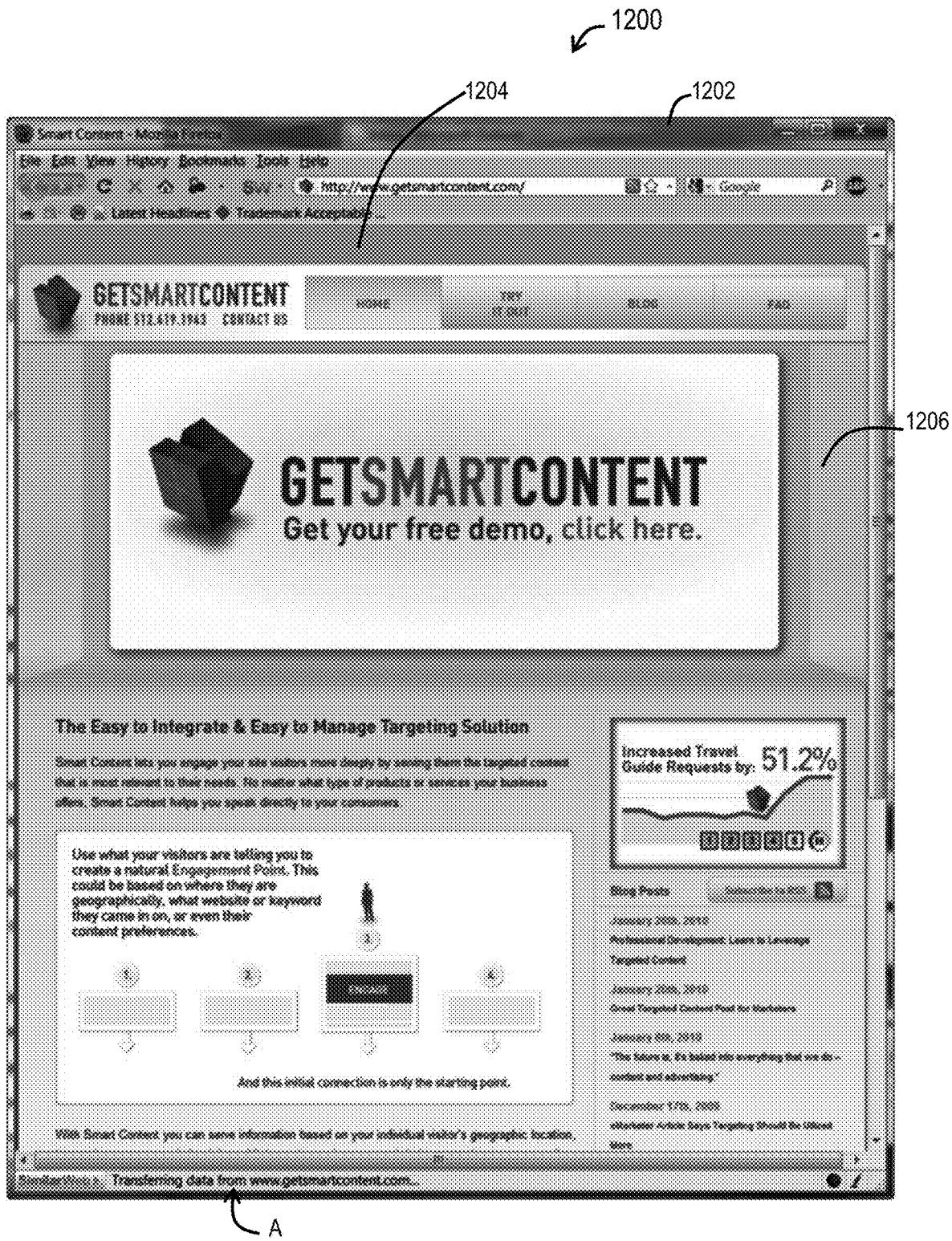
FIG. 12 illustrates an exemplary message displayed in website processed by a browser of a client device, according to certain embodiments of the invention.

Referring to FIG. 12, a browser 1202, such as a browser program stored in memory and processed by a client device, displays a website 1204 and a message 1206 as part of the website. The message 1206 is displayed by the browser 1202 as part of the website 1204, as the browser 1202 processes a message device received from a message server according to the embodiments. As previously described, the browser 1202 originally processes a web file for the website 1204 which includes a script device. The script device detects a locator of the browser 1202 and identity of the website 1204, and communicates an identification device representing the locator and identity to the message server. The message server creates a message server script device, in conjunction with the database and its applicable Campaign Rules and priority policies, and generates the corresponding message device and communicates the message device to the browser 1202. The browser 1202 processes the message device (note, for example, the browser 1202 continues processing the message device as indicated by A in FIG. 12). The message device detects states and features of the browser 1202 and client device, per the particular message device, and communicates to the message server relevant call devices representing the states and features so detected (including, for example, interaction with prior displayed messages, number of site visits, historical browsing, and other possibilities). In response to receiving each call device, the message server performs a look-up in the database, via the message server script device, Campaign Rules, and priority policies for the particular website 1204 and browser 1202, and communicates a select message file to the browser 1202 for each respective call device. Each select message file is received and processed by the browser 1202 to display a unique, select, and relevant message, for example, the message 1206 is one such message, targeted in content for the particular browser 1202, website 1204 and interests of the user of the browser 1202.

Numerous alternatives are possible in the embodiments. In certain alternatives, for example, the message server and database incorporate elements, rules and processes, such as into Campaign options or otherwise, input by statistical, analytical or quantitative web services, such as, for example, as may now or in the future be available from Google, Inc. (e.g., Website Optimizer™), Adobe Systems Inc. (e.g., Omniture® Test & Target™), or others.

Further, in the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for serving targeted content messages over a network to a web browser device communicatively connected to the network, the web browser device processes a website file, the web browser device having a network address for communicating on the network, comprising:
   a browser-side script device of the website file, processed by the web browser device, the browser-side script device initially when processed communicates over the network an identifier of the website file and the network address of the web browser device and, during a browsing session with the website file, sends at least one call in respect of an action in the web browser device;
   a server computer communicatively connected to the network, the server computer includes a memory, the server computer configured to receive communication from the browser-side script device of the website file processed by the web browser device at the network address and to thereafter receive at least one call;
   a database communicatively connected to the server computer, the database includes at least one rule device for the website file and a plurality of message artifacts for the website file;
   a server-side script writer of the server computer responsive to communication over the network from the browser-side script device to the server computer, the server-side script writer, responsive to communication from the browser-side script device, creates a server-side script based on the at least one rule device, the identifier of the website file, and the network address of the web browser device and, the server computer on receiving the at least one call, creates at least one server-side script, respectively, corresponding to the at least one call, respectively;
   a message configurator device of the server corresponding to the server-side script;
   a prioritizer of the database, the prioritizer selectively orders retrieval, according to at least one rule device for the website file, of a plurality of message artifacts;
   a respective select message artifact of the database, retrieved by the message configurator device based on the prioritizer of the database; and
   a respective select message corresponding to the respective select message artifact, created by the message configurator device responsive to each of the at least one call, respectively, over the network received by the server-side script from the browser-side script device, for display in the website in the browser device, the respective select message communicated by the server-side script over the network to the browser-side script device.

2. The system of claim 1, further comprising:
   a memory of the web browser device;
   a web browser program stored in the memory of the web browser device;
   a web server computer communicatively connected to the network;
   a server file of the web server computer, the server file is accessible to the web browser program from the web server computer over the network as the website file, wherein the browser-side script device included in the website file is unique to the website file; and
   wherein the web browser program stored in memory of the web browser device processes the website file, including the browser-side script device communicates the network address of the web browser device to the web server computer, and receives the respective select message in a website display of the website file in the web browser program.

3. The system of claim 2,
   wherein the database includes unique ones of the at least one rule device for a plurality of website files and unique ones of the plurality of message artifacts for each respective one of the plurality of website files;
   wherein a plurality of web browser devices communicatively connect to the network for access to respective ones of the plurality of website files;
   wherein the server-side script writer of the server computer creates a unique one of the server-side script, respectively, for each one of the web browser device, based on the network address of the one of the web browser device, for respective one or more of the plurality of the website file accessed by the one of the web browser device;
   wherein a unique one of the message configurator device, respectively, of the respective one or more of the plurality of the website file accessed by each one of the web browser device corresponds to the server-side script writer based on the at least one rule device for the respective one or more of the plurality of the website file and the network address of the one of the web browser device;

wherein the respective select message artifact of the database is retrieved by the message configurator device by processing the prioritizer of the database; and wherein the respective select message displayed in each one of the web browser device corresponds to the respective select message artifact of the unique one of the message configurator device, respectively, unique to the respective one of the web browser device.

4. The system of claim 1,
wherein the respective select message includes a logical block responsive to activity of the web browser device.

5. A method of serving targeted content messages for display in a website accessed in a browser program of a networked computer communicatively connected to a network at a network address for communications, comprising:
placing a script device in a website file for the website;
processing the website file, together with the script device concealed in processing, in the browser program, including:
determining the network address of the networked computer;
determining an identifier of the website file;
sending an artifact representing the network address and the identifier over the network, to a server computer communicatively connected to the network; and
displaying the website in the browser program with the script device concealed in processing;
wherein the server computer receives the artifact, queries a database in response, retrieves a database article related to the network address and the identifier, constructs a script program stored in memory of the server computer, based on the query, and transmits over the network a first message for display in the website;
receiving by the web browser device from the server computer the first message for display in the website, the first message corresponds to the database article and includes a message device constructed by the server script program, the message device is processed concealed from display by the browser program;
calling the server computer, by the message device, by communication of an action identifier of an action representing an action of the web browser device;
wherein the server computer receives the action identifier from the network, queries the database in response for a next database article related to the script program, the action identifier of an action, the website file, and the web browser, and transmits a next message over the network for display in the website;
receiving by the web browser device from the server computer the next message unique to the web browser device and the browser program for display in the website.

6. The method of claim 5, wherein the server computer prioritizes
the database article and the next database article, among a plurality of database articles.

7. The method of claim 6, wherein a website server remote from the server computer prioritizes at least a portion of the database articles, via communicative connection over the network.

8. The method of claim 5, wherein the website file is communicatively served by a web server over the network, to the browser program; and
a rule policy of the web server prioritizes among the database article and the next database article for the website file.

9. A method of providing a targeted content message service over a communications network, comprising:
providing an administration website communicatively accessible by a network device over the network;
accessing the administration website by the network device via the network;
delivering a plurality of message items to a message server database;
setting a rule policy of the message server database by the network device, via input to the administration website, to prioritize respective ones of the plurality of message items;
providing a website file to a web server computer communicatively connected to the network;
serving a website generated by the website file of the web server computer, to a browser program stored in memory of a client device communicatively connected to the network, the website includes a browser-side script device processed concealed in the website displayed by the browser program;
receiving a unique network address of the client device and an identifier of the website file by a server computer communicatively connected to the network, from the browser-side script device processed in the browser program;
querying the database for the unique network address and the identifier, based on the rule policy of the step of setting;
constructing a script program stored in memory of the server computer, based on the step of querying the database for the unique network address and the identifier;
constructing an ad device by the server computer based on the script program stored in memory of the server computer;
querying the database for a select one of the plurality of message items, based on the unique network address and the identifier;
constructing a message by the server computer, for the select one of the plurality of message items, the message is unique for the unique network address, the identifier and the web browser and includes the ad device;
sending the message by the server computer, to the browser program for display of the select one of the message items by the browser program;
receiving from the ad device and the browser-side script device an indicator by the server computer via the network, representing a state of the web browser; and
logging an item representing the indicator by the server computer.

10. The method of claim 9, further comprising:
constructing a next message by the server computer, corresponding to the indicator, the ad device and the browser-side script device; and
repeating the steps of sending the next message by the server computer, to the browser program and logging a next indicator representing a next state of the web browser and the next message.

11. The method of claim 10, further comprising:
setting up a campaign account file of the database for the website file, via the administration website; and
wherein the step of setting the rule policy corresponds to the campaign file and the campaign file corresponds to the website file.

12. The method of claim 11, wherein a plurality of unique campaign account files are set up via the administration website;
wherein each campaign account file relates to one or more website file, each website file is related to at least one unique message item of the database, each website file includes a respective unique script device;
wherein the sending delivers a unique message to the web browser and to a plurality of web browsers accessing the website file, each has a unique network address; and
wherein each respective one of the plurality of web browsers accessing the website file exhibits a unique status and delivers to the server a respective unique indicator.

13. The method of claim 10, further comprising:
varying the ad device in memory of the server computer, based on the logging; and
second varying the ad device in memory of the server computer, based on the repeating of logging.

14. The method of claim 9, further comprising:
varying the ad device in memory of the server computer, based on the logging.

* * * * *